US012734630B2

(12) United States Patent
Vuadens et al.

(10) Patent No.: US 12,734,630 B2
(45) Date of Patent: Sep. 15, 2026

(54) COMBINED TRANSFER AND STORAGE DEVICE AND MANUFACTURING LINE FOR MACHINING

(71) Applicant: CHIRON Group SE, Tuttlingen (DE)

(72) Inventors: Samuel Vuadens, Finhaut (CH); Dylan Maret, Martigny (CH); Blaise Mettan, Evionnaz (CH); Mathieu Cheseaux, Saillon (CH)

(73) Assignee: CHIRON Group SE, Tuttlingen (DE)

( * ) Notice: Subject to any disclaimer, the term of this patent is extended or adjusted under 35 U.S.C. 154(b) by 0 days.

(21) Appl. No.: 19/178,002

(22) Filed: Apr. 14, 2025

(65) Prior Publication Data

US 2025/0235971 A1 Jul. 24, 2025

Related U.S. Application Data

(60) Division of application No. 18/631,932, filed on Apr. 10, 2024, now abandoned, which is a continuation of (Continued)

(30) Foreign Application Priority Data

May 28, 2021 (DE) ..................... 10 2021 113 892.2

(51) Int. Cl.

*B23Q 7/04* (2006.01)
*B23Q 1/01* (2006.01)
*B23Q 3/155* (2006.01)

(52) U.S. Cl.

CPC ............. *B23Q 7/046* (2013.01); *B23Q 1/015* (2013.01); *B23Q 3/1554* (2013.01); *B23Q 7/047* (2013.01); *B23Q 2003/155407* (2016.11)

(58) Field of Classification Search

CPC ...... B23Q 7/046; B23Q 1/015; B23Q 3/1554; B23Q 7/047; B23Q 2003/155407;

(Continued)

(56) References Cited

U.S. PATENT DOCUMENTS 4,736,512 A * 4/1988 Gusching ............... B23Q 7/046 82/125
4,930,976 A 6/1990 Spacher et al.

(Continued)

FOREIGN PATENT DOCUMENTS

CN 110315380 A 10/2019
DE 3543209 A1 6/1987

(Continued)

OTHER PUBLICATIONS

Search Report for corresponding German Patent Application No. 10 2021 113 890.6, mailed Apr. 22, 2022.

(Continued)

*Primary Examiner* — Sarang Afzali
*Assistant Examiner* — Darrell C Ford
(74) *Attorney, Agent, or Firm* — Jason H. Vick; Amped IP LLC

(57) ABSTRACT

A combined transfer and storage device for machining includes a storage level, a transfer device, at least one machining interface, and a feeding interface. The storage level has two or more storages that are spaced apart from one another in a longitudinal direction and storage spaces for workpiece carriers, which are arranged one above the other for holding blanks or machined workpieces. The transfer device extends in the longitudinal direction. The machining interface is used for directly or mediately coupling with a machine tool. The feeding interface is accessible for a driverless transport vehicle. The transfer device accomplishes a workpiece transfer between the feeding interface, the storage level and the at least one machining interface. A manufacturing line is provided with a combined transfer and storage device and with at least one manufacturing system having at least one machine tool and a handling cell.

18 Claims, 9 Drawing Sheets

Related U.S. Application Data application No. 17/826,785, filed on May 27, 2022, now Pat. No. 11,980,989.

(58) Field of Classification Search

CPC ......... Y10T 29/53187; Y10T 29/53313; Y10T 29/53374; Y10T 29/534; Y10T 29/53404; Y10T 29/49829; Y10T 29/49831

See application file for complete search history.

(56) References Cited

U.S. PATENT DOCUMENTS

| | | | | |
|---|---|---|---|---|
| 5,271,139 | A | 12/1993 | Sticht | |
| 5,781,983 | A * | 7/1998 | Gruner | B23Q 7/1494 409/164 |
| 6,556,888 | B2 | 4/2003 | Kantola | |
| 11,203,091 | B2 | 12/2021 | Jeannerat et al. | |
| 11,980,989 | B2 | 5/2024 | Vuadens et al. | |
| 2003/0050160 | A1* | 3/2003 | Popp | B23Q 11/0053 409/168 |
| 2006/0270540 | A1 | 11/2006 | Takayama et al. | |
| 2007/0087924 | A1* | 4/2007 | Krosta | B23Q 3/15536 483/62 |
| 2012/0024091 | A1 | 2/2012 | Kawabuchi et al. | |
| 2012/0301253 | A1* | 11/2012 | Hessbrueggen | B23Q 11/0891 82/122 |
| 2014/0079500 | A1* | 3/2014 | Boehringer | B23Q 7/046 409/134 |
| 2015/0298271 | A1 | 10/2015 | Murata | |
| 2016/0202424 | A1 | 7/2016 | Kewitsch et al. | |
| 2016/0325400 | A1* | 11/2016 | Murakami | B25J 9/0018 |
| 2019/0084102 | A1 | 3/2019 | Jeannerat et al. | |
| 2019/0255668 | A1 | 8/2019 | Williamson | |
| 2020/0009634 | A1* | 1/2020 | Oshel | B30B 15/028 |
| 2020/0316775 | A1 | 10/2020 | Ooshima et al. | |
| 2022/0234213 | A1 | 7/2022 | Hock et al. | |
| 2022/0379419 | A1 | 12/2022 | Vuadens et al. | |
| 2024/0253172 | A1 | 8/2024 | Vuadens et al. | |

FOREIGN PATENT DOCUMENTS

| | | | |
|---|---|---|---|
| DE | 102004031929 | A1 | 1/2006 |
| DE | 60116731 | T2 | 8/2006 |
| DE | 202005012039 | U1 | 12/2006 |
| DE | 102005034079 | A1 | 1/2007 |
| DE | 102009040811 | A1 | 3/2011 |
| DE | 202010000754 | U1 | 6/2011 |
| DE | 102011000107 | A1 | 10/2011 |
| DE | 202013008677 | U1 | 10/2013 |
| DE | 102014114258 | A1 | 8/2015 |
| DE | 102015206914 | A1 | 10/2015 |
| DE | 202017102297 | U1 | 7/2017 |
| DE | 202019003026 | U1 | 8/2019 |
| EP | 1607174 | A1 | 12/2005 |
| EP | 2227349 | B1 | 4/2011 |
| EP | 3398711 | A1 | 11/2018 |
| JE | 2036664 | A1 | 3/2009 |
| JP | 2011-224663 | A | 11/2011 |

OTHER PUBLICATIONS

European Search Report for corresponding European Patent Application No. 22174060.8, mailed Oct. 13, 2022.

Search Report for corresponding German Patent Application No. 10 2021 113 892.2, mailed Apr. 22, 2022.

European Search Report for corresponding European Patent Application No. 22174063.2, mailed Oct. 17, 2022.

Third Party Objection for corresponding European Patent Application No. 22174063.2, mailed Jan. 20, 2025.

Office Action for U.S. Appl. No. 17/826,738, mailed Mar. 28, 2025.

Office Action for U.S. Appl. No. 17/826,785, mailed Oct. 25, 2023.

Notice of Allowance for U.S. Appl. No. 17/826,785, mailed Feb. 7, 2024.

Office Action for U.S. Appl. No. 18/631,932 mailed Sep. 28, 2024.

Fanuc "RoboDrill Twin Cell Demo" Screenshot of video available at https://www.youtube.com/watch?v=b1udXFGC5mU; Date Unknown.

Office Action for corresponding European Patent Application No. 22174060.8, mailed Jun. 26, 2025.

Observations by Third Parties According to Art. 115 EPC filed by Precitrame Machines SA against corresponding European Patent Application No. 22174060.8, mailed Jun. 6, 2025.

Office Action for U.S. Appl. No. 17/826,738, mailed Apr. 8, 2026.

* cited by examiner

Z
Y
X
36
54
32
22
50
26
12
18
24
44
46
58
30
28
34
52
60
56
78
84
82
80
76
70
62
74

108
106
104
100
110
112
102
114
116

COMBINED TRANSFER AND STORAGE DEVICE AND MANUFACTURING LINE FOR MACHINING

CROSS-REFERENCE TO RELATED APPLICATIONS

This application is a Divisional of U.S. patent application Ser. No. 18/631,932, filed Apr. 10, 2024, which is a Continuation of U.S. patent application Ser. No. 17/826,785, filed May 27, 2022, now U.S. Pat. No. 11,980,989, which claims priority to national German patent application No. 10 2021 113 892.2, filed on May 28, 2021. All of which are incorporated herein by reference in their entirety.

BACKGROUND

The present disclosure generally relates to precision machining with machine tools. According to certain embodiments, the present disclosure relates to a manufacturing system for machining. According to further embodiments, the present disclosure relates to a combined transfer and storage device for machining. Further, the present disclosure relates to a manufacturing line for machining, which comprises a combined transfer and storage device and a manufacturing system.

According to certain aspects, the present disclosure relates to compact-design machine tools and their integration into manufacturing systems and manufacturing lines for machining. By way of example, compact-design machine tools are those with a working space that is less than 250 mm×250 mm×250 mm.

In exemplary embodiments, the working space of the machine tool is smaller than 200 mm×200 mm×200 mm. In exemplary embodiments, the working space of the machine tool is smaller than 150 mm×150 mm×150 mm. In exemplary embodiments, the working space of the machine tool is smaller than 100 mm×100 mm×100 mm. In exemplary embodiments, the working space of the machine tool is smaller than 75 mm×75 mm×75 mm. In certain embodiments, these values relate to the possible feeds (travel ranges) along the X-, Y- and the Z-axis. The working space can be formed in the shape of a cube. However, parallelepiped installation spaces are also conceivable, whose travel ranges in X, Y and Z are not uniform.

By way of example, such machine tools are suitable for precision machining, for example in the context of manufacturing of watches, jewelry and the like. It is understood that other applications are also conceivable. By way of example, the workpieces include round blanks for watches and similar precision-mechanic products. By way of example, the workpieces are watch plates, bottom plates, gears, dials, bridges, latch bolts, covers and housing parts are for watches, and similar flat parts.

Machine tools and manufacturing lines for machining are known. From US 2019/0084102 A1, there is known a manufacturing line, which comprises a plurality of compact-design machine tools that are arranged one above the other and next to each other, which are arranged in a common housing, wherein additional a robot is provided for tool change and/or workpiece change, which is movable horizontally and arranged on a beam that is movable vertically.

From EP 2 227 349 B1, a movable robot cell having a housing is known, which can be arranged, as required, in front of an opening of a working space of a processing machine, so as to pick up workpieces with a robot.

From EP 2 036 664 A1, a manufacturing line for workpieces is known, with at least one processing machine, with a protective housing comprising at least one shelf magazine, and with a loading device for loading and unloading the processing machine, which is arranged inside the protective housing, wherein the loading device comprises a movable carriage that is movable along a guide and provided with an adjustable boom, which carries at least one handling unit for parts to be handled, wherein the guide for the carriage is provided in an overhead area, and wherein the boom of the loading device, which is articulated on the underside of the carriage comprises two coupled arms that can be pivoted to each other.

From DE 35 43 209 A1, a manufacturing system for flexible manufacturing of workpieces is known, which comprises one or more machine tools, a transport system for workpieces, which connects the machine tools, and a feeding apparatus for every machine tool, which is arranged between the machine tool and the transport system, and which is arranged for loading and unloading the machine tool.

From DE 10 2014 114 258 A1, an arrangement is known, which comprises a single-place cutting machine and a robot cell wherein the robot cell can be coupled, for loading and unloading, to the cutting machine, wherein the cutting machine comprises a machine space and the robot cell comprises a robot cell space, and wherein in the coupled state of the robot cell, the machine space and the robot cell space form a common processing space.

By way of example, it has been observed that with a compact-design machine tool, even with relatively low outer dimensions of the machine tool, the desired workpieces can be manufactured with high precision and efficiency.

However, it has also been observed that in view of automation aspects, with compact-design machine tools, specific boundary conditions have to be taken into account. On the one hand, transfer systems, handling units and the like cannot be designed to be arbitrarily compact. Even if this was possible from a technical point of view, in practice there are often certain minimum dimensions for transfer systems, handling unit, robot, gripper and the like.

Under certain circumstances, as a result, the machine tool as such (and its working space, respectively) is small in relation to the automation equipment (handling equipment, transfer systems and the like).

Further, the automation equipment (for example robot with gripper and the like) has to interact with the machine tool in the installation space (optionally working space) of the machine tool, to enable a transfer of workpieces and optionally tools.

Further, it has been observed that, even with compact-design machine tools, there is often a need for an opportunity to a direct visual monitoring by the operator. Similar to machine tools of a larger design, access ports (doors) with windows are regularly asked for. As a result, with an automatic manufacturing line, this area ("front side" of the machine tool) is not being available for the automation equipment.

Further, it has been observed that compact-design machine tools are often designed to be smaller, in relation to the customary automation equipment. This results in specific requirements for the automation of compact-design machine tools. Further, there are new opportunities for the automation and interlinking, which were not be possible to be implemented with conventional machine tools, as the case may be.

It is an object of the present disclosure to present innovations for machining, for instance for precision machining, by means of compact-design machine tools.

It is a further object of the present disclosure to present innovations for the automation of the machining procedure, for example for handling cells and the like, which take into account the specific conditions with compact-design machine tools.

It is a further object of the present disclosure to present manufacturing systems, which allow a partially automated or even a highly automated production, even with only small installation spaces. In certain embodiments, this relates to the workpiece change. In certain embodiments, this relates to the tool change.

It is a further object of the present disclosure to present a combined transfer and storage device, which can be combined with at least one manufacturing system that comprises a machine tool.

It is a further object of the present disclosure to present a combined transfer and storage device that enables an efficient and at least partially autonomous manufacture of medium and large series, at least in certain embodiments.

It is a further object of the present disclosure to present a manufacturing line, which is capable of linking a manufacturing system having a handling cell with a combined transfer and storage device.

It is a further object of the present disclosure to present novel approaches relating to the interlinking and automation of compact-design machine tools.

SUMMARY

According to an aspect, the present disclosure relates to a manufacturing system for machining, for instance for manufacturing of precision machining workpieces, which comprises:

- at least one machine tool, in exemplary embodiments of compact-design, which is arranged for multi-axis machining, and which comprises a tool holder and a workpiece holder that are movable relative to each other in at least three axes,
- wherein the tool holder and the workpiece holder are arranged at a rear side of a working space of the machine tool,
- a handling cell comprising the following:
  - a first interface to the machine tool, which is laterally coupled to the working space,
  - a second interface for transfer purposes,
  - a handling unit, for instance in the form of a handling robot, and
  - at least one buffer storage,
- wherein the handling unit is arranged for an automated workpiece change.

In this way, the machine tool can be operated at least partially automated. By way of example, this involves that workpieces can be changed partially automated or fully automated.

The handling cell is arranged adjacent to the working space of the machine tool, for example laterally, with a small distance. The handling unit is assigned to the handling cell and not to the machine tool. This means that at the machine tool, which comprises a relatively small working space, complex interventions and adaptions are not necessary.

The front side of the working space is therefore visible and accessible for an operator, at least in an exemplary embodiment. The front side can be referred to as operator side. The front side is arranged opposite to the rear side. Lateral sides of the working space are providing for the handling (workpiece change, tool change). In this way, the compact design is taken into account.

The handling unit can be moved to the workpiece holder and, where applicable, a pallet that is already arranged there, to carry out a workpiece change (loading and unloading). This can also apply to the removal of remaining pieces (waste).

In an exemplary embodiment, the tool holder is arranged as a tool spindle and is provided with a vertically oriented axis. The tool holder is assigned to a pivot axis and/or a swivel table of the machine tool, for instance.

The first interface can also be referred to as a loading interface. The second interface can also be referred to as transfer interface.

Via the second interface, the handling cell and therefore the manufacturing system can be coupled with a transfer device or a combined transfer and storage device. In other words, the handling unit can cooperate with another handling equipment/transfer equipment, to supply and/or remove workpieces at the buffer storage of the handling cell. By way of example, this can take place block by block, in trays or the like.

The handling cell can serve as gate between the machine tool (and/or its working space) and a transfer system. In an exemplary embodiment, the basic structure of the machine tool, for instance the mechanical basic structure, remains largely or almost unaffected, when the machine tool is coupled with the handling cell. This enables a use of the machine tool in manufacturing lines and systems with different levels of automation. The handling cell can also be referred to as handling module.

In an exemplary embodiment, the working space of the machine is primarily available, at least predominantly, optionally even exclusively, for machining. In other words, in an exemplary embodiment, the working space is not occupied by handling equipment and the like, at least during the machining procedure. Also in this way, the limited installation space is taken into account.

It has been observed that compact-design machine tools, even with a small installation space, are suitable for the precise manufacture of specific precision-mechanic components, for instance watch plates. By way of example, the required accuracy can be ensured by travel distances that are rather limited, and by design elements, like projections, having rather small dimensions. As an overall result, a lower deformation tendency and therefore a higher precision despite the compact design is achieved. However, for the automation, the compact design must be taken into account.

According to an exemplary embodiment of the manufacturing system, the handling unit provides a primary function and at least one secondary function, wherein the primary function comprises a workpiece change, and wherein the secondary function comprises a tool change.

In other words, at least in exemplary embodiments, the handling cell can also be used for the tool change. According to at least one exemplary embodiment, this involves only a secondary function, therefore a function, which is subordinate compared to the workpiece change. However, to expand the application range of the handling cell, a primary function and a secondary function are provided for.

According to another exemplary embodiment of the manufacturing system, the handling unit is arranged as an articulated robot, for instance as a hanging articulated robot, whose movement range encompasses the first interface, a workpiece transfer position with the tool holder and, at least in certain embodiments, also the second interface. In other words, the handling unit can be arranged as an industry robot, for example as an industry robot in a hanging arrangement.

According to an exemplary embodiment, the handling unit is in a hanging arrangement. In this way, the floor area, for example of the handling cell, can be used otherwise.

According to another exemplary embodiment of the manufacturing system, the handling unit comprises a double gripper, which is arranged at least for gripping blanks. In this way, blanks can be transferred into the machine tool, wherein this is combinable with a removal of the previous workpiece without long time delay. With a double gripper, the workpiece change times can be reduced.

By way of example, the machine tool is arranged in a machining cell, which is adjacent to the handling cell. In an exemplary embodiment, the handling unit is at least sectionally overlapping with its movement range the working space of the machine tool, so that a loading process and optionally also an unloading process is possible. In this way, blanks can be transferred to the workpiece holder. This can involve a transfer of the blanks to a pallet or a clamping device, which is arranged at the workpiece holder or arranged as a part of the workpiece holder.

In another embodiment, the double gripper is also arranged to grip tool parts. This comprises, in an exemplary embodiment, workpieces, which are separated from a surrounding remaining piece of the blank. In another embodiment, this comprises machined workpieces, which are still connected with the remaining piece of the blank.

In another exemplary embodiment, the double gripper is arranged to grip remaining pieces, which are a result of the separation of the workpiece from the blank. By way of example, such remaining pieces are referred to as slugs. By way of example, the workpieces are round blank-shaped, disk-shaped, oval or cornered, and are formed as a cutout of the blank, wherein optionally a remaining piece is left.

Depending on whether the workpieces are completely separated from the remaining piece of the blank, the handling unit can take over and remove workpieces without remaining piece, workpieces that are still connected with the remaining pieces, or remaining pieces that are separated from workpiece. When a double gripper is provided, a new blank can be placed without large delay at the workpiece holder.

According to another exemplary embodiment of the manufacturing system, the buffer storage comprises at least one support for a workpiece carrier with a plurality of storage locations, which is arranged at least for receiving blanks. By way of example, the workpiece carrier is arranged as a tray or a workpiece pallet to pick up a plurality of workpieces and/or blanks. In an exemplary embodiment, the workpiece carrier is also arranged for receiving processed workpieces and/or remaining pieces.

The workpiece carrier can also be arranged and referred to as tray. The workpiece carrier can be provided via the second interface. By way of example, this can take place via a transfer system. However, a manual feeding unit, optionally machine-assisted, is also conceivable.

If workpiece carriers are provided, which can hold a plurality or variety of workpieces (and blanks and/or remaining pieces, respectively), the relatively fragile workpieces can be handled and transferred efficiently. By way of example, the transfer can take place between a storage level of a combined transfer and storage device and a machine tool, wherein the transfer takes place through the handling cell. This enables an efficient transfer of a variety of parts, which are held by the workpiece carrier. If this (global) transfer takes place, by using workpiece carriers, individual workpieces can be moved quick and safe. Further, storing or buffer storing is simplified; this can take place, as required, also directly in the (transportable) workpiece carrier. For the handling of the workpiece carrier, it is not mandatory to apply the accuracy and the care that would have to be observed as such with the handling of the workpieces.

The handling cell enables, in turn, the separation of the workpieces. This (local) transfer can take place, while taking into account the accuracy requirements, as well as the potential fragility of the workpieces. For this purpose, the handling cell can further comprise a reference part, which comprises a defined stop for a blank of the workpiece, by way of example. Hence, the workpiece can be aligned specifically at the reference part. In this way, the requirements for accuracy of the orientation of the workpieces at the workpiece carrier are reduced.

According to another exemplary embodiment of the manufacturing system, at least a first workpiece carrier is provided for providing blanks and a second workpiece carrier is provided for receiving processed workpieces or remaining pieces, which can be supported together in the handling cell. In this way, the handling cell itself can provide a buffer storage. The handling cell can be operated autonomously or partially autonomously, at least for a certain number of workpieces, without requiring an additional transfer via the transfer interface.

In an exemplary embodiment, the workpiece carriers, in the handling cell, are arranged in the movement range of the handling unit. By way of example, two trays or two workpiece pallets can be used, wherein a first workpiece carrier is provided for blanks and a second workpiece carrier is provided for machined parts. The handling cell can provide respective supports for the workpiece carriers.

According to another exemplary embodiment, the manufacturing system further comprises at least one auxiliary storage, which is for instance arranged for storing samples. The auxiliary storage can be also arranged as a quarantine store.

By way of example, the auxiliary storage can be used for intermediate storage of workpieces, for which measurements or similar measures for quality control are planned. In a similar way, the auxiliary storage can also be used as a buffer storage for potential poor parts, which are optionally released after examination as good parts. The handling of the buffered parts can take place within the handling cell.

According to another exemplary embodiment of the manufacturing system, the handling unit comprises a suction gripper, which is for instance arranged for picking up processed workpieces. By way of example, the handling unit is arranged for a change between a mechanical gripper (with gripper fingers or claims) and a suction gripper (fluid gripper). In the case of a double gripper, a combination of a mechanical gripper and a suction gripper is basically also conceivable.

A suction gripper enables the handling of fragile workpieces. In this way, workpieces that are completely separated from the remaining piece of the blank can be gently removed out of the working space, by way of example.

According to another exemplary embodiment of the manufacturing system, the handling cell further comprises a monitoring station, for example an optical monitoring station. In this way, a production-related monitoring can take place. This may have the effect that workpieces can already be tested before they get back into the (global) transfer and storage device. A monitoring station in the handling cell can be combined with an auxiliary storage in the handling cell.

According to another exemplary embodiment, the manufacturing system further comprises at least one reference part for aligning workpieces, for instance for centering. In this way, the blanks can be centered, by way of example. This enables the use of loading aids with a reduced requirement in terms of the positioning accuracy.

In other words, the handling unit, by way of example, can first grip a blank from the workpiece carrier (e.g., tray) and then place it at the reference part, to align the blank and optionally to center it. In this way, positioning errors during loading and uploading of the machine tool can be reduced.

According to another exemplary embodiment of the manufacturing system, at least the first interface between the machine tool and the handling cell is closeable with a door, for instance by a sliding door. By way of example, the door is arranged in the manner of a guillotine, i.e., as a vertically movable sliding door. Other closing devices are conceivable.

The door enables a hermetic separation between the working space and the handling cell during machining. This is also possible since the handling unit of the handling cell does not occupy the working space of the machine tool during machining, but is only brought in for the workpiece change as required. In an exemplary embodiment, the handling unit of the handling cell is, during machining, completely moved out of the machining cell.

The design as a vertically movable door enables the accessibility of the respective front side (operator side) of the handling cell, and also of the manufacturing side. By way of example, in the opened state, the door can enter an area (above or below the interface), which is not otherwise used and the clear view of the operator is not disturbed. In addition, the second interface can be provided with such a sliding door or in different way with a closure device.

According to another exemplary embodiment, the manufacturing system further comprises a setup cell with a handling manipulator, for instance in the form of a setup robot, wherein the setup cell and the handling cell are coupled on opposite sides to the working space of the machine tool. The setup cell can also be referred to as setup module.

The machine tool comprises, according to this embodiment, on a first side an interface to the handling cell and on a second side, for instance opposite to the first side, a second interface to the setup cell. In other words, the machine tool and/or the machining cell is arranged between the setup cell and the handling cell, in an exemplary embodiment.

In this way, the front side remains free and visible. In addition, the interface between the machine tool and the setup cell can be provided with a door, for example with a sliding door, for instance in the form of a vertically movable door (guillotine). The handling manipulator can be moved to the tool holder (tool spindle) when the interface is passable. With the handling manipulator, at least tools can be changed.

According to an exemplary embodiment, a machining cell, to which the machine tool is assigned, is arranged between the setup cell and the handling cell.

According to an exemplary embodiment, each of the machining cell, the setup cell and the handling cell is provided with an own support structure, (frame, rack and the like). According to an exemplary embodiment, at least the handling cell comprises a housing, which is separated from the housing of the machining cell. In an exemplary embodiment, the setup cell and the machining cell comprise a common (exterior) housing. However, it is conceivable that the machining cell, the setup cell and the handling cell are arranged on one and the same base (base frame).

According to another exemplary embodiment of the manufacturing system, the handling manipulator provides a primary function and at least one secondary function, wherein the primary function comprises a tool change and wherein the secondary function comprises a workpiece change.

In other words, in the context of the individual production or the production of small series, the handling manipulator of the setup cell can be used for a workpiece change, by way of example. This enables a direct access for individual workpieces. It is not mandatory to use the (global) transfer and storage device.

The tool change usually takes place by using double grippers, so that a fast change between a tool to be replaced and a replacing tool is possible. In an exemplary embodiment, in the setup cell a park position is provided for the double gripper. In this way, the double gripper can be deposited there, when the handling manipulator is used for further functions.

According to another exemplary embodiment of the manufacturing system, the handling manipulator provides at least one secondary function, which comprises a block setup with a tool kit. By way of example, this comprises the transfer of a tool carrier, which provides places for several tools. By way of example, the tool carrier is arranged as a disc carrier or a turret carrier with a plurality of storage locations for tools, wherein the storage locations for the tools, are circularly distributed around a center. By way of example, the handling manipulator can deposit the double gripper, in order to grab a tool carrier thereafter and, as required, transfer it between the setup cell and an environment.

In this way, a plurality of tools can be made available quickly. From the amount of the tools, which are kept at the tool carrier, individual ones can be changed in a targeted way into the tool holder (tool spindle) of the machine tool.

According to another exemplary embodiment of the manufacturing system, the handling manipulator is arranged as a SCARA robot, which comprises two or more pivoting axes that are parallel to each other, wherein the SCARA robot is, at least in certain embodiments, linearly movable along an axis that is oriented parallel to the pivoting axis. By way of example, a SCARA robot is a horizontal articulated arm robot with several pivot axes, which are horizontally oriented.

In an exemplary embodiment, the handling manipulator of the setup cell is arranged with its base at a vertical oriented guide rail in the setup cell. In this way, the handling manipulator is, as a whole, vertically movable. This degree of freedom of movement does not have to be provided by the swivel joints of the handling manipulator. A tool change usually comprises the placing of the gripper in a horizontal plane for gripping of the replacing tool or of the tool to be replaced, and a vertical movement to move it out from the respective seat and to dispose/engage it at a new target position.

According to another exemplary embodiment of the manufacturing system, the machine tool comprises:

- a frame block,
- a Y-carriage, which is arranged on a Y-guide on an underside of the frame block, and which is movable horizontally relative to the frame block,
- an X-carriage, which is arranged on an X-guide on an inclined side of the frame block, and which is movable horizontally relative to the frame block, wherein the frame block is arranged as an inclined bed frame block, and wherein the X-carriage is movable along an X-axis, which is oriented perpendicular to a Y-axis, along which the Y-carriage is movable, a Z-carriage, which is arranged on a Z-guide at a front of the X-carriage and which is movable vertically, and a rotatory drive mounted directly or mediately on the Y-carriage, which supports a table with a workpiece holder.

In this way, a compact-design machine tool with small dimensions and a high stiffness can be realized.

According to another exemplary embodiment of the manufacturing system, the machine tool is assigned to a machining cell, which is separated from the handling cell and, in certain embodiments, also from the setup cell. By way of example, the machining cell is arranged between the handling cell and the setup cell. The separation primarily aims at a spatial separation. For a transfer between the machining cell and the handling cell, an interface is provided. For a transfer between the machining cell and the setup cell, another interface is provided.

In other words, the machining cell with the machine tool can be supplemented, with little effort, by a handling cell and, as required, by a setup cell, in order to form an at least partially automated manufacturing system. The manufacturing system enables an at least partially automated workpiece change. In exemplary embodiments, the manufacturing system enables an at least partially automated tool change.

The compact arrangement of the machine tool enables a cabinet-like design, at which a substructure is provided that accommodates control equipment, fluid equipment, auxiliary units and the like. This applies at least to exemplary embodiments. In these embodiments, a superstructure is arranged on the substructure, which comprises the actual machine tool. The hanging arrangement of the Y-carriage at the frame block ensures that machining forces and reaction forces are endured by a compact core of the machine tool. By way of example, the arrangement of the substructure of the cabin-like structure has no or only a minor impact on the static stiffness of the machine tool.

By way of example, the arrangement of lower cabinet and upper cabinet is adapted to the usual body size of an operator, so the elements in the upper cabinet are clearly visible and easily accessible. In a similar way, the handling cell can be arranged in a cabinet-like manner, wherein the handling unit is located in an upper cabinet on top of a lower cabinet. Similarly, the setup cell can also be cabinet-like in design, with the handling manipulator located there in an upper cabinet arranged on a lower cabinet. By way of example, the height of the manufacturing system is 1.50 m to 2.50 m, wherein a subdivision take place in lower cabinet and upper cabinet.

The present disclosure further relates to a manufacturing line for machining having a manufacturing system according to at least one of the embodiments described herein and a combined transfer and storage device, wherein the manufacturing line comprises:

a storage level, comprising two or more storages that are spaced apart from one another in a longitudinal direction and provided with storage locations, which are arranged one above the other, for workpiece carriers for holding blanks or machined workpieces, a transfer device extending in the longitudinal direction, comprising for instance a ground-side guide and a traveling column, which is carrying a handling device, at least one machining interface, which is arranged adjacent to or between the storages, for direct or mediate coupling with a machine tool, at least one feeding interface, for instance at the front of the device, which is accessible for a driverless transport vehicle, wherein the transfer device accomplishes a workpiece transfer between the feeding interface, the storage level and the at least one machining interface, and wherein a workpiece transfer between the device and the machine tool takes place mediately by using a handling unit of the handling cell.

The handling cell is arranged between the machining cell with the machine tool, and the combined transfer and storage device. By way of example, the transfer and storage device is suitable for storing and transferring of a variety of workpieces, which are respectively arranged in a workpiece carrier, which provides a variety of receiving seats. The separation and handling of individual workpieces can then take place in the handling cell.

The manufacturing line can comprise a plurality of manufacturing systems, which are each coupled to a machining interface. In this way, consecutive processing steps can be carried out by interlinked machine tools, wherein the workpiece transfer takes place partially automated or highly automated. The manufacturing line further comprises at least a limited storage capacity. This enables a partially automated or highly automated operation, for instance overnight or over the weekend. This can result in a bus topology extended by storage capabilities, wherein the combined transfer and storage device connects a plurality of manufacturing systems with each other.

According to another aspect, the present disclosure relates to a combined transfer and storage device for machining, for instance for precision machining workpieces, which comprises:

a storage level, comprising two or more storages that are spaced apart from another in a longitudinal direction and provided with storage locations, which are arranged one above the other, for workpiece carriers for holding blanks or machined workpieces, a transfer device extending in the longitudinal direction, for instance comprising a ground-side guide and a traveling column, which is carrying a handling device, at least one machining interface, which is arranged adjacent to or between the storages, for direct or mediate coupling with a machine tool, and at least one feeding interface, for instance on the front of the device, which is accessible for a driverless transport vehicle, wherein the transfer device accomplishes a workpiece transfer between the feeding interface, the storage level and the at least one machining interface.

The unit is suitable for the handling of precision machining workpieces with limited dimensions, for example for components of watches, jewelry and the like. Such workpieces are often sufficiently small, so that the place for storage/buffering, which is required in the storage level, is not excessively large compared to the installation space, which is already necessary for the transfer device and the coupling of machine tools and the like via machining interfaces.

By way of example, the combined transfer and storage device can comprise an aisle, in whose middle a ground-side (or ceiling-side) guide is arranged, wherein on the right and left sides storage and machining interfaces can be arranged. If the transfer device is capable of transferring workpiece carriers through the at least one machining interface, a placement in a storage and/or a removal out of the storage is also possible. One and the same transfer device can therefore serve the storage level and can be used for an exchange through the machining interfaces. In an exemplary embodiment, the same transfer device can also be used for the exchange via the feeding interface.

By way of example, the workpiece carriers can be arranged as trays or workpiece pallets. The workpiece carriers can be arranged for accommodating a plurality of workpieces, blanks, semi-finished products, remaining pieces, slugs and the like. The handling device, which is arranged at the transfer device, can also be referred to as workpiece carrier handling device.

The feeding interface serves on the one hand for loading with new workpieces, for example in the form of blanks, at least in exemplary embodiments. The feeding interface further serves also for removing processed workpieces and/or remaining pieces, at least in exemplary embodiments. The supply and removal of workpieces can take place via one and the same feeding interface. It is also conceivable to provide at a first end of the device a first feeding interface and at a second end a second feeding interface.

According to an exemplary embodiment of the device, at least one storage is arranged as a storage shelf. In this way, a plurality of storage locations for workpiece carriers, which are arranged one above the other, can be provided. By way of example, with a head-high design of the transfer device a significant number of workpieces can be stored in workpiece carriers, which are arranged one above the other, and which can be retrieved, if necessary. In addition, it has to be taken into account that common precision machining workpieces are of compact-design, at least in relation to common transfer and handling equipment. In other words, a variety of storage locations can be provided, without significantly increasing the footprint of the device.

According to another exemplary embodiment of the device, the transfer device is arranged to transfer a workpiece carrier, as required, in a longitudinal direction and a transverse direction, for instance in a horizontal plane. In this way, the workpiece carrier can be moved along the guide. An exchange with the storage and/or an exchange through a machining interface usually comprises a lateral movement in the transverse direction.

According to another exemplary embodiment of the device, the transfer device comprises a traveling column and a longitudinal drive, which moves the traveling column along the longitudinal direction. By way of example, this involves a longitudinal drive with a ground-side guide, for example in the form of a guide rail. By way of example, at this guide a carrier is arranged, which carries a traveling column (driving column).

According to another exemplary embodiment of the device, the handling unit comprises a movable linear drive, which linearly moves the workpiece carriers in a horizontal plane, and wherein the linear drive is vertically movable, at least in certain embodiments. In other words, the linear drive is additionally provided to the longitudinal drive. The linear drive provides the lateral movement in the transverse direction. By way of example, the linear drive comprises a console, which is vertically movable by a vertical drive (lift drive). By way of example, the console is mounted to be vertically movable at a vertical guide of the traveling column. The vertical movement (lifting movement) can be used for picking up and for placing workpiece carriers.

According to another exemplary embodiment of the device, the linear drive is arranged as a telescopic linear drive. In other words, the linear drive is using the provided installation space efficiently. By way of example, this refers to the lateral movement in the transverse direction. With a given width of the aisle, which is extending in the longitudinal direction, there remains only little installation space in the transverse direction. This is efficiently used by a telescopic design of the linear drive. In other words, the linear drive can comprise a limited extension and yet provide a considerable travel range.

According to another exemplary embodiment of the device, the linear drive comprises a telescopic guide with two guide portions, which are arranged parallel to each other, and wherein a first guide portion is assigned to a base guide and a second guide portion is assigned to a carrier for workpiece carrier. This enables a travel range, which is ideally almost twice the travel range of a single guide.

According to another exemplary embodiment of the device, the carrier comprises two supporting seats for workpiece carriers. In certain embodiments, a rotatory drive is provided for the supporting seats. By way of example, the two supporting seats are arranged offset by 180° to each other and facing each other.

In this way, an efficient exchange of two workpiece carriers can take place. Only a 180° rotation is required to provide one of both places, at least in an exemplary embodiment. In other words, an exchange of a workpiece carrier can take place without large (global) movements of the transfer device.

In an exemplary embodiment, the supporting seats are each inclined with respect to the horizontal and/or with respect to the extension of the guide portions of the telescopic guide. This applies in an exemplary embodiment also to supporting seats in the storages of the storage level (global storage) and supporting seats in the handling cell (buffer storage). This facilitates the engagement and the pickup of the workpiece carriers with the handling unit of the transfer device.

As the workpieces are not transferred directly via the handling unit, the requirements in terms of accuracy of the movements of the transfer device and of the handling unit are reduced. The workpiece carriers, which are carried and moved by the handling unit are arranged sufficiently robust, therefore a high transfer speed is possible.

According to another exemplary embodiment of the device, the handling unit further comprises a rotatory drive, which rotates the orientation of the linear drive in the horizontal plane. In this way, the linear drive can comprise a longitudinal orientation or a transverse orientation, by way of example. Further, depending on the design, a transverse orientation to the right or transverse orientation to the left is conceivable. In this way, the travel range that is available can be used.

According to another exemplary embodiment of the device, the rotatory drive is arranged for pivot the linear drive between a 0° position, a 90° position and a 180° position. Therefore, the transfer unit and/or the handling unit, which is held in place by the transfer unit, supply the right longitudinal side and the left longitudinal side of the device. In this way, both on the right longitudinal side and on the left longitudinal side, storages, machining interfaces and optionally transfer interfaces can be provided.

According to another exemplary embodiment of the device, both on a first side and on a second side, with respect to the longitudinal direction, at least one storage and/or one machining interface for coupling of a machine tool is provided. In other words, the transfer device can extend and move along an aisle between a first (for example left) vertical plane and a second vertical plane, so that a transfer of the workpiece carrier to the right and to the left is possible, in this aisle. In this way, the given installation space is efficiently exploited. A variety of storage locations can be provided. Further, machine tools can be coupled onto both sides. This can result in a bus topology that is extended by a storage option, wherein several machine tools are coupled to a combined transfer and storage device, which provides both the bus for transfer and storage options.

By way of example, the device extends along the longitudinal direction, wherein, along the longitudinal extension, on each of the right and left side, a plurality of storages and at least one machining interface are provided. A machine tool can be coupled directly or mediately to the respective machining interface. By way of example, at at least one of the two end faces of the device, a feeding interface is arranged, which is arranged for the exchange of workpiece carriers with the environment.

According to another exemplary embodiment of the device, the transfer device extends along the longitudinal direction, between a first end face and a second end face, wherein at least at the first end face or the second end face a feeding interface is arranged. There, a transport vehicle, for example a driverless transport vehicle, can couple to the device. In an exemplary embodiment, the feeding interface is provided with a vertical opening door, for example with a roller shutter, up-and-over door, or a segment door.

In an exemplary embodiment, the extension of the device in longitudinal direction is larger than the height of the device. This results in sufficient installation space, to move a door into the interior space of the device. This may have the effect that the feeding interface, to which in an exemplary embodiment a vehicle is coupled only temporarily, is closed in an uncoupled state.

According to another exemplary embodiment of the device, there is provided exactly one feeding interface at the end face, wherein the transfer device is movable, back and forth, along the longitudinal direction, to receive blanks at the feeding interface and discharge processed workpieces and/or remaining pieces. The transfer device can therefore, on the one hand, load the device itself and on the other hand provide for a workpiece transfer between the coupled machine tools (optionally with each handling cell).

According to another exemplary embodiment of the device, the feeding interface is provided with a door that is movable between a closed position and an open position, wherein the door, in the opened position, is guided at least partially on a ceiling side at an upper side of the device. This may have the effect that the door, when opening and closing, does not require significant installation space on the lateral sides. Therefore, this area is provided for storage and/or machining interfaces. In the opened state, the door can be placed, at least sectionally, horizontally orientated under the roof of the device. In the closed state, the door is vertical orientated. By way of example, the door is arranged as a link door or a segment door.

According to another exemplary embodiment of the device, at least one machining interface is coupled with a machine tool, which comprises the following:

- a frame block,
- a Y-carriage, which is arranged on a Y-guide on the underside of the frame block, and which is movable horizontally relative to the frame block,
- an X-carriage, which is arranged on an X-guide on an inclined side of the frame block, and which is movable horizontally relative to the frame block, wherein the frame block is arranged as an inclined bed frame block, and wherein the X-carriage is movable along an X-axis, which is orientated perpendicular to a Y-axis, along which the Y-carriage is movable,
- a Z-carriage, which is arranged on a Z-guide at a front of the X-carriage, and which is movable vertically, and
- a rotatory drive mounted directly or mediately on the Y-carriage, which supports a table with a workpiece holder.

In this way, the machine tool can work autonomously for a certain period; a high number of workpieces can be provided and stored after machining. Several machine tools can be interlinked via the device.

According to another exemplary embodiment of the device, a handling cell is arranged between at least one machining interface and a machine tool, which comprises the following:

- a first interface to the machine tool, which is laterally coupled to the working space,
- a second interface for the machining interface for transfer purposes,
- a handling unit, for instance in the form of a handling robot, and
- at least one buffer storage, for instance for holding at least one workpiece carrier, wherein the handling unit is arranged for an automated workpiece change.

The transfer of workpieces between the storage level of the device and the working space of the machine tool takes place in accordance with this embodiment by a use of the transfer device of the device itself, and the handling unit of the handling cell. The workpieces are separated in the handling cell and removed from the workpiece carrier. The handling of the combined transfer and storage device takes place in a packed condition at the workpiece carrier.

The present disclosure further relates to a manufacturing line for machining, with a combined transfer and storage device according to at least one embodiment described herein, and with at least one manufacturing system with at least one machine tool and a handling cell, which is arranged between a machining interface of the device and the machine tool, wherein a workpiece transfer between the device and the machine tool takes place mediately by using a handling unit of the handling cell.

In this way, the transfer and storage device can be combined with the manufacturing system, to provide a manufacturing line, which is operable partially automated or highly automated.

It is to be understood that the previously mentioned features of the present disclosure and those mentioned in the following may not only be used in the respectively indicated combination, but also in other combinations or as isolated features without leaving the spirit and scope of the present disclosure.

BRIEF DESCRIPTION OF THE DRAWINGS

Further features and advantages of the disclosure are disclosed by the following description of a plurality of exemplary embodiments, with reference to the drawings, wherein.

EMBODIMENTS

Figure 1:
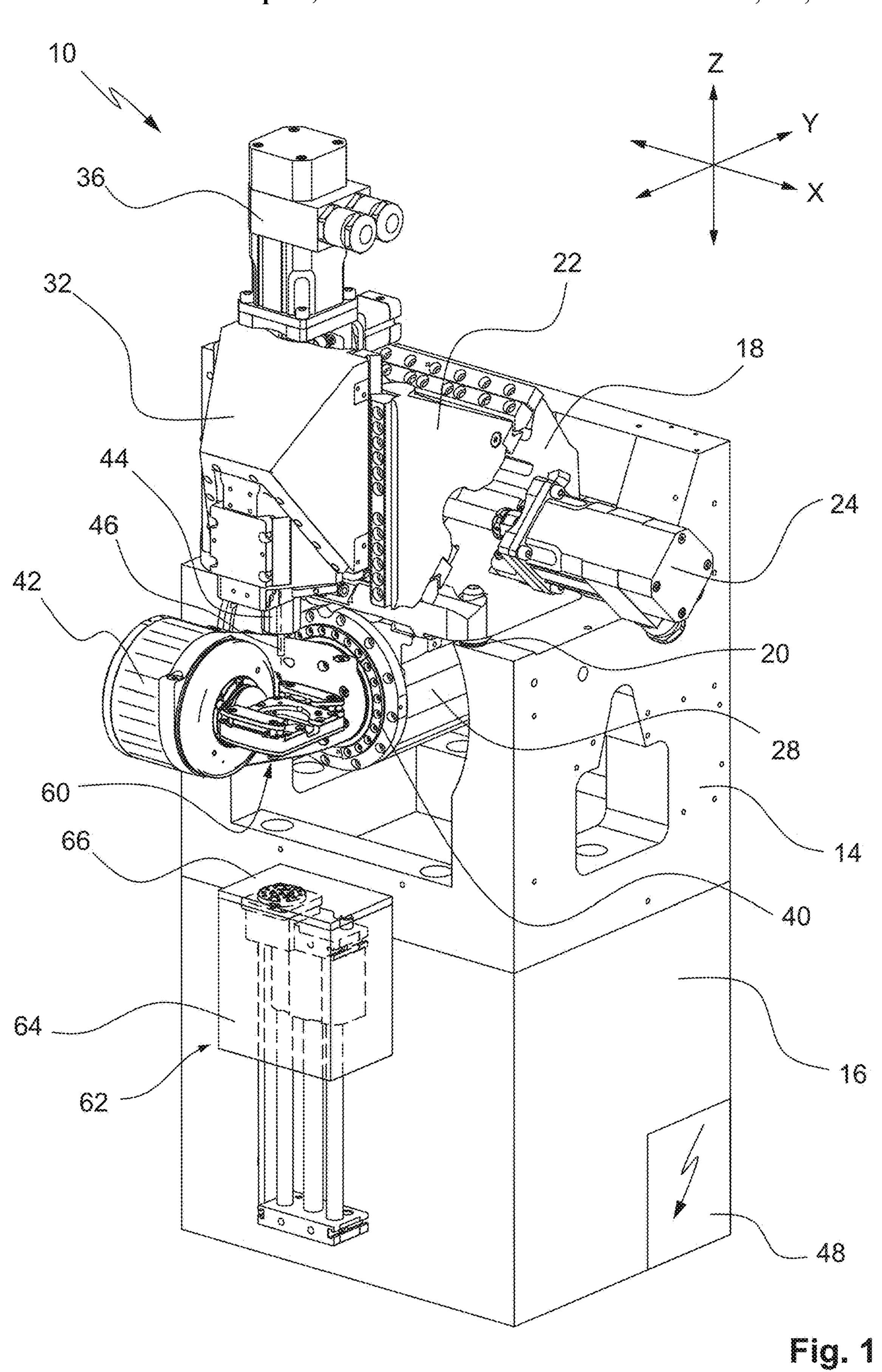
FIG. 1: is a perspective view of a machine tool with workpiece holder.
Figures 2, 3:
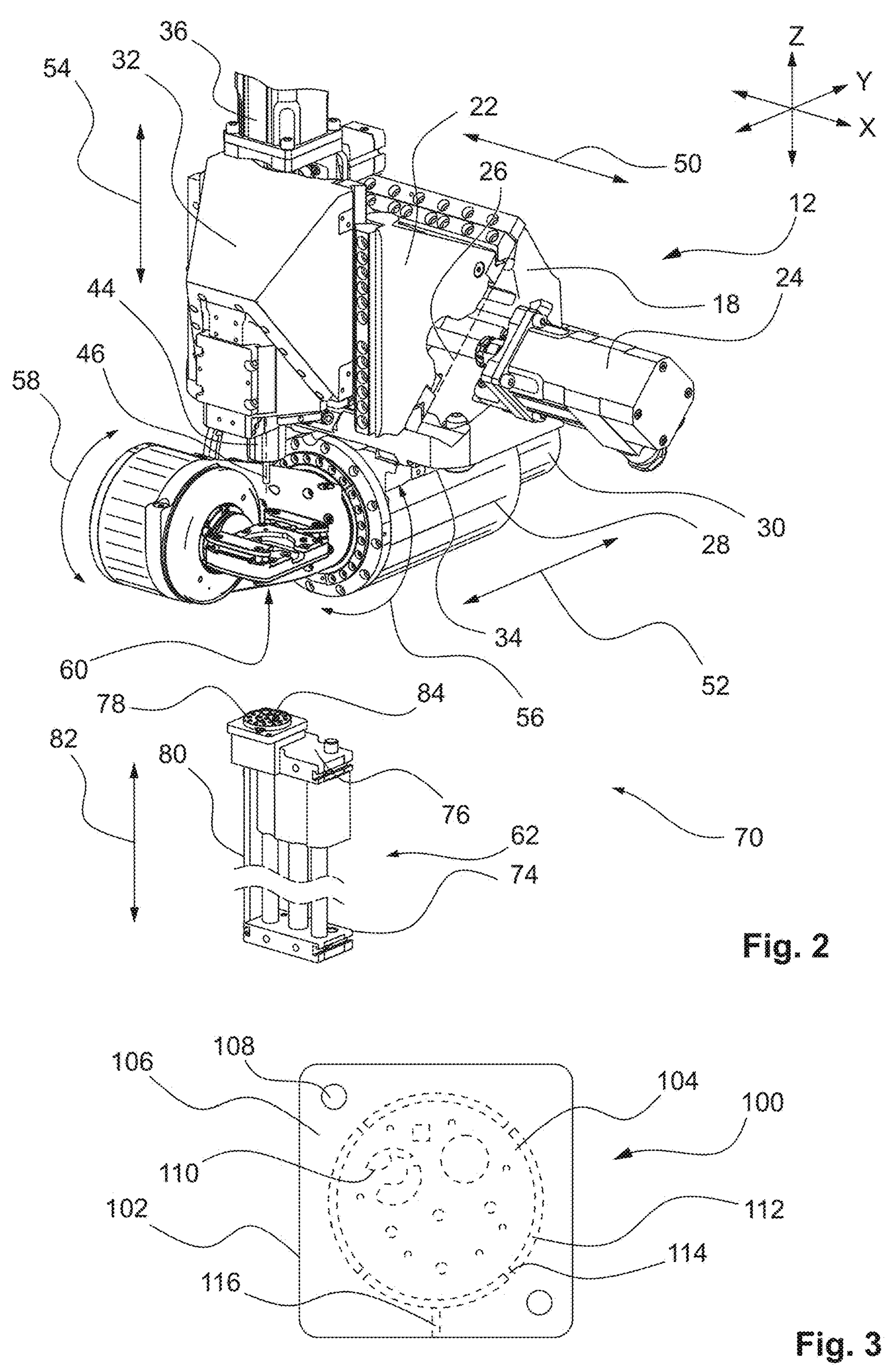
FIG. 2: is another view of the machine tool with omission of the components that are shown in in FIG. 1.
FIG. 3: is a view of a flat blank, based on which a workpiece is produced.

FIG. 1 illustrates, by means of a perspective representation, an exemplary embodiment of a machine tool 10, which is provided for manufacturing of compact precision machining components. FIG. 2 shows a corresponding representation for illustrating a core machine 12 of the machine tool 10.

The machine tool 10 comprises a support frame 14, which is, in the exemplary embodiment, mounted on an underframe 16. The core machine 12 comprises a frame block 18. The frame block 18 is mounted via bearing points 20 at the support frame 14. By way of example, four such bearing points 20 are provided. The core machine 12 is arranged such that travel drives of the machine tool 10 are mounted, directly or mediately, at the compact frame block 18. This results in a favorable force application. In other words, the support frame 14 and the underframe 16, in the exemplary embodiment according to the FIGS. 1 and 2, have to absorb usually only weight forces, but not reaction forces, which arise during machining. The compact frame block 18 enables a space saving design of the core machine 12 and the whole machine tool, at least in the embodiment, which is illustrated with reference to the FIGS. 1 and 2.

Further, for illustrative reasons, a Cartesian coordinate system X-Y-Z is integrated in the FIGS. 1 and 2. The assignment of the axes takes place according the common conventions in the field of the machine tools. The X-axis usually describes a side extension. The Y-axis usually describes a depth extension. The Z-axis usually describes a height extension (vertical). The X-axis and the Y-axis are usually horizontal orientated. The axes X-Y-Z are usually perpendicular to each other.

A so-called A-axis usually describes rotational movements about the X-axis. A B-axis usually describes rotational movements about the Y-axis. A C-axis usually describes rotational movements about the Z-axis. If a rotation axis (or pivot axis) is in a kinematic chain directly or mediately retained and kept rotatable by another rotational axis (pivot axis), the above assignment typically changes. This is known to the skilled person.

The machine tool 10 according to the FIGS. 1 and 2 is arranged as a so-called five-axes-machine, wherein three translatory axes (X, Y, Z) and two rotatory axes (for example B-axis and C-axis) are provided. In principle, a design as a four-axes-machine is also conceivable, whereby then usually only one rotatory Y-axis (for example B-axis) is provided. In the field of the machine tools, the term axis usually comprises an assembly of two parts that are movable relative to each other, corresponding guides/bearing, and an associated drive. It is understood that the skilled person knows other axis allocations and can transform them, if necessary.

The core machine 12 comprises an X-carriage 22, which is mounted at the frame block 18 and linear movable in the X-direction, see also a double arrow designated by 50 in FIG. 2. For the movement of the X-carriage 22, a drive 24 is provided. In the exemplary embodiment according to FIGS. 1 and 2, the X-carriage 22 is guided at an inclined side 26 of the frame block 18. In other words, the frame block 18 provides an inclined bed for the X-carriage 22. By way of example, the inclined side 26 is inclined by 30° to 60° relative to a vertical plane, which is defined by the axes X and Z.

Further, a Y-carriage 28 is provided, which is mounted and linearly movable in the Y-direction at the frame block 18, cf. also a double arrow designated by 52 in FIG. 2. For the movement of the Y-carrier 28, a drive 30 is provided, cf. FIG. 2. In other words, the Y-carrier 28 is hanging at the underside 34 of the frame block 18. This leads to the desired compact design of the frame block 18. Reaction forces, which are generated upon machining, are guided through the frame block 18 at a short path. The support frame 14 and the underframe 16 serve primarily as a platform for the frame block 18. The stiffness of the machine tool 10 primarily depends of the stiffness of the core machine 12, for instance of the stiffness of the frame block 18.

The core machine 12 further comprises a Z-carriage 32, which is mounted and linearly movable at the frame block 18 in the Z direction, cf. also a double arrow designated by 54 in FIG. 2. For the movement of the Z-carriages 32, a drive is provided.

Further, a rotatory drive 40 is assigned to the Y-carriage, which can also be referred to as B-drive or B-axis. In the exemplary embodiment, the rotatory drive 40 carries another rotatory drive 42, which can also be referred to as C-drive or C-axis. The rotatory drives 40, 42 can be rotatory drives, such as rotary drives or pivot drives. The possible pivot movement of the rotatory drive 40 is indicated by a curved double arrow 56 in FIG. 2. The possible pivot movement of the rotatory drive 42 is indicated by a curved double arrow 58 in FIG. 2.

The arrows 50, 52, 54, 56, 58 in FIG. 2 illustrate in total five movement axes. In the exemplary embodiment, the axes 50 and 54 are tool axes, which are moving the tool. However, the axes 52, 56 and 58 are workpiece axes, which are moving the workpiece. In FIG. 1 there is further indicated by 48 a control device for the machine tool 10. The machine tool 10 is regularly provided with an NC or CNC controller.

In the exemplary embodiment, the Z-carriage 32 carries a tool holder 44, on which a processing tool 46 is accommodated. By way of example, the processing tool 46 is a milling cutter, a drill and the like. It is understood that during machining a tool change can take place. The tool holder 44 is part of a tool spindle (not explicitly shown in FIGS. 1 and 2) with a drive for the processing tool 46. In this way, the processing tool 46 can be rotated about its longitudinal axis (in the exemplary embodiment vertical axis). Other designs are conceivable.

At the rotatory drive 42 (for example C-axis), a workpiece holder 60 is attached. A workpiece, which is accommodated there, can be moved via the axes 52, 56, 58. The workpiece holder 60 can be referred to as pallet or workpiece pallet, or can be coupled therewith. The integration or the support of a clamping device at the workpiece holder 60 is also conceivable. Depending on the specific design and control, the B-axis (arrow 56) and/or the C-axis (arrow 58) can be used for rotating the workpiece holder 60 by 180°. In other words, in this way, the workpiece holder 60 can be rotated with the workpiece, to be able to process workpieces on at least two sides.

In an exemplary embodiment based on the machine tool 10 that is provided with five driven axes 50, 52, 54, 56, 58, according to FIG. 1 and FIG. 2, the rotatory drive 42 (C-axis 58) can be dispensed with if the workpiece holder 62 is instead attached directly at the rotatory drive 40 (B-axis 56).

The workpiece holder 60 can be part of a support device 70, which further comprises a support unit 62. The support unit 62 is used for a temporary support of a workpiece to be machined, if needed, when the workpiece holder 60 assumes a certain position (for example: neutral position). By way of example, this may be advantageous when thin workpieces with high accuracy shall be produced.

The workpiece holder 60 and the support unit 62 can be implemented independently of each other. In certain embodiments and for certain applications, the workpiece holder 60 and the support unit 62 are combined with each other. In this way, a support device 70 with support units 62 and workpiece holders 60 can be formed.

In the exemplary embodiment illustrated in FIG. 1, the support unit 62 comprises a housing 64 and a lid 66, which closes the housing 64 towards the workpiece holder. The lid 66 can be opened, if necessary, to move elements of the support unit 62 towards the workpiece holder 60. In the closed state, the lid 66 prevents the ingress of chips and the like.

The support unit 62 comprises a base 74, which is fixedly connected with the machine tool 10. The base 74 carries a carrier 76, which is movable by a drive 80, cf. the double arrow 82 in FIG. 2. In this exemplary embodiment, the carrier 76 is vertically movable. This is not to be understood to be limiting. A horizontal movability of the carrier 76 is also conceivable, if the workpiece holder 60 is oriented accordingly.

At the carrier 76, a support plate 78 is accommodated, which approaches, in the extended state of the support unit 62, the workpiece holder 60 and cooperates therewith, to support a workpiece. By way of example, the support plate 78 comprises positive locking elements 84, which are adapted to the contour of the workpieces. The support plate 78 is adapted to the design of the workpieces (approximately round-shaped, oval or angular shape). In this way, a thin workpiece with high precision can also be proceed, if a support through a support plate 78 takes place. Further, by way of example, the support plate 78 can be used for holding a remaining piece, which is separated from the workpiece, if the workpiece holder 60 is unloaded and is supplied with a new blank.

FIG. 3 illustrates with reference to a plan view of a flat side, an exemplary embodiment of a workpiece 100. The workpiece 100 is produced based on a flat blank 102. By way of example, thin blanks 102 are sewn off as splices from a semi-finished product (rod). The blank 102 exemplarily consists of a metal material, for instance such as brass, steel, aluminum, titanium or the like.

In the exemplary embodiment according to FIG. 3, the workpiece 100 comprises, a round-shaped shape, cf. the round blank 104. The workpiece 100 is arranged circular or substantially round. There are also different designs conceivable (oval, round or even angular shape).

The workpiece 100 is produced through machining in the blank 102. After the processing, a margin (remaining piece) 106 remains. In other words, the workpiece 100, in the exemplary embodiment, is finally cut out of blanks 102 and/or separated from the edge 106. By way of example, the blank 102 is provided with at least one positioning aid 108. The at least one positioning aid 108 enables an exact and precise positioning of the blank 102 for processing.

In the workpiece 100, design elements 110 are usually formed during processing, e.g., blind holes, through holes, openings, recesses, and the like. The machining for forming design elements 110 takes place, in an exemplary embodiment, on a flat side. In certain exemplary embodiments, the machining takes place on both (opposite) flat sides. It may therefore be advantageous if the workpiece holder 60 enables the blank 102 to be accessible in the area of the workpiece 100 to be produced on both flat sides.

The separation of the workpiece 100 from the surrounding margin 106 of the blank 102 takes place, for example, by a slot or an annular gap slot 112, which is produced by machining. In an exemplary embodiment, initially the annular gap slot 112 is produced in a non-continued fashion, instead bridges 114 are remaining, which connect the workpiece 100 (and/or the circular blank 104) with the surrounding margin 106. At the end of the machining, the bridges 114 are removed, to separate the workpiece 100 from the margin 106. The machining of the workpiece 100 can comprise processing steps in a (single) machine tool 10 or processing steps in several machine tools 10.

FIG. 3 further illustrates with reference to a cutting 116 a lateral machining, for which a lateral or frontal feed of the tool (cf. the processing tool 46 in FIGS. 1 and 2) is required. If a cutting 116 or a similar lateral design element is to be produced, it may be advantageous that the blank 102 is not resting there on the support with its margin 106.

With reference to the FIGS. 4-7, a manufacturing system 120 is illustrated, which is provided with a machine tool 10 that is arranged at least similar to the exemplary embodiment, which is elucidated with reference to FIGS. 1 and 2. The machine tool 10 has a very compact design, wherein this is in certain embodiments reflected in a compact-design core machine 12, with a compact-design frame block 18.

With reference to the FIGS. 8-11, a manufacturing line 250 is described, which is for instance arranged as a manufacturing line for machining. The manufacturing line comprises a combined transfer and storage device, which is coupled with, at least one machine tool 10 and/or with at least one manufacturing system 120, to be able to supply and remove workpieces 100 automatically (partially automated or completely automated).

Figure 4:
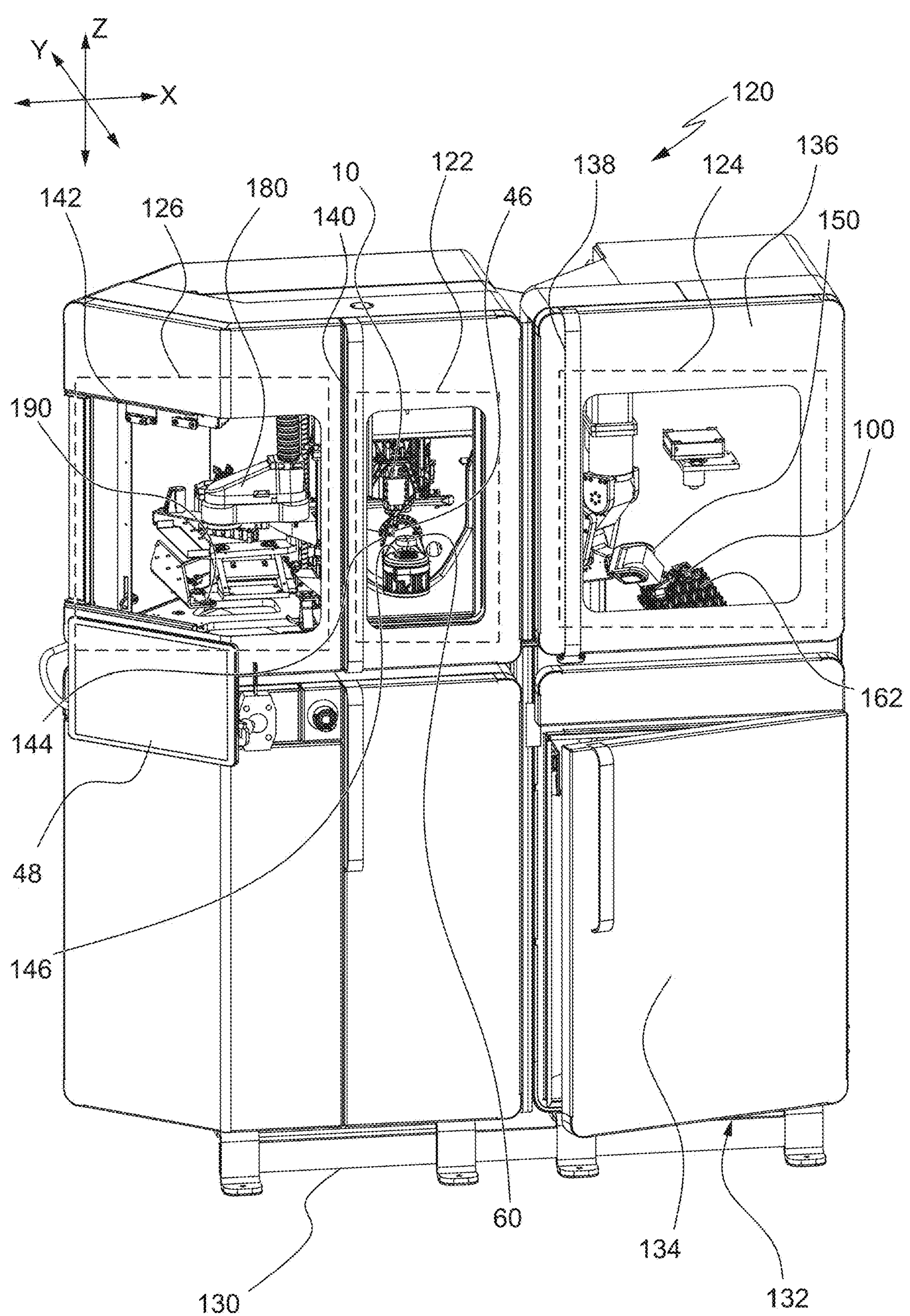
FIG. 4: is a perspective view of a manufacturing system with a machine tool, a handling cell and a setup cell.

FIG. 4 shows a perspective frontal view on an exemplary embodiment of a manufacturing system, which is designated by 120. The manufacturing system 120 is in the exemplary embodiment of a modular design. The manufacturing system 120 comprises, at least one machining cell 122, which is provided with a machine tool 10, cf. the exemplary description of the machine tool 10 with reference to the FIGS. 1 and 2.

The manufacturing system 120 further comprises, in the exemplary embodiment, a handling cell 124 and a setup cell 126. The handling cell 124 is used primarily (primary function) for the transfer of workpieces 100 (and/or of their blanks 102), i.e., for the workpiece change. The setup cell 126 is used primarily (primary function) for the tool change.

The machine tool 10 is arranged between the handling cell 124 and the setup cell 126. The manufacturing system 120 comprises, in the exemplary embodiment, a common basis 130 for the machining cell 122, the handling cell 124 and the setup cell 126. Further, a housing 132 is provided that is designed approximately cabinet-like. The housing 132 is, in the exemplary embodiment, provided with a substructure

134 and a superstructure 136. This applies to the machining cell 122, the handling cell 124 and the setup cell 126.

Here, the compact design of the machine tool 10 becomes apparent. By way of example, the manufacturing system 120 with the housing 132 is designed to be approximately man height. Man height means, in the illustrated exemplary embodiment, that the respective superstructure 136 is easy to reach for a standing operator. By way of example, the respective substructure 134 is used for the accommodation of auxiliary units, auxiliary components, energy supply, control technology and the like. The substructure 134 is, in the exemplary embodiment, designed to be approximately table high. The superstructure 136 is (taking into account the substructure 134) shaped approximately cabinet-high.

In other words, the manufacturing system 120 comprises a cabinet-like layout with substructure 134 and superstructure 136, wherein the machine tool 10 defines, with its axes, a working space 144, which is located in the superstructure 136. In the exemplary embodiment, structural components of the machine tool 10, cf. for instance the frame block 18, and the carriages 22, 28, 32 in FIG. 1 and FIG. 2, are also arranged in the superstructure 136, i.e., in the upper section of the cabinet-like housing 132.

This design is possible due to of the compactness of the machine tool 10. However, this compactness, which defines a small working space 144, involves certain boundary conditions for the automation (workpiece change, tool change).

In the working space 144, a processing tool 46, which is held at the machine tool 10, and a workpiece holder 60 for holding a workpiece 100 can be moved relative to each other, to machine the workpiece 100. In the exemplary embodiment, according to FIG. 4, the workpiece holder 60 is arranged at a table 146. By way of example, the table 146 is assigned to the C-axis, but this is not to be understood to be limiting.

FIG. 4 illustrates the front side of the manufacturing system 120 in a perspective view. The manufacturing system 120 is arranged such that an operator, which is standing in front of the housing 132, relevant sections of the machining cell 122, of the handling cell 124, and of the setup cell 126 are easily accessible and visible. This is made possible by corresponding viewing windows in the respective (upper) superstructure 136 of the machining cell 122, of the handling cell 124 and of the setup cell 126.

Further, a control device is indicated by 48, which is arranged herein for instance as a control panel, a touchscreen or the like. The machining cell 122, the handling cell 124 and the setup cell 122 are respectively accessible via doors 138, 140, 142 in the superstructure 136. The machining cell 122, the handling cell 124 and the setup cell 122 can also be referred to as modules of the manufacturing system 120.

Figures 5, 6:
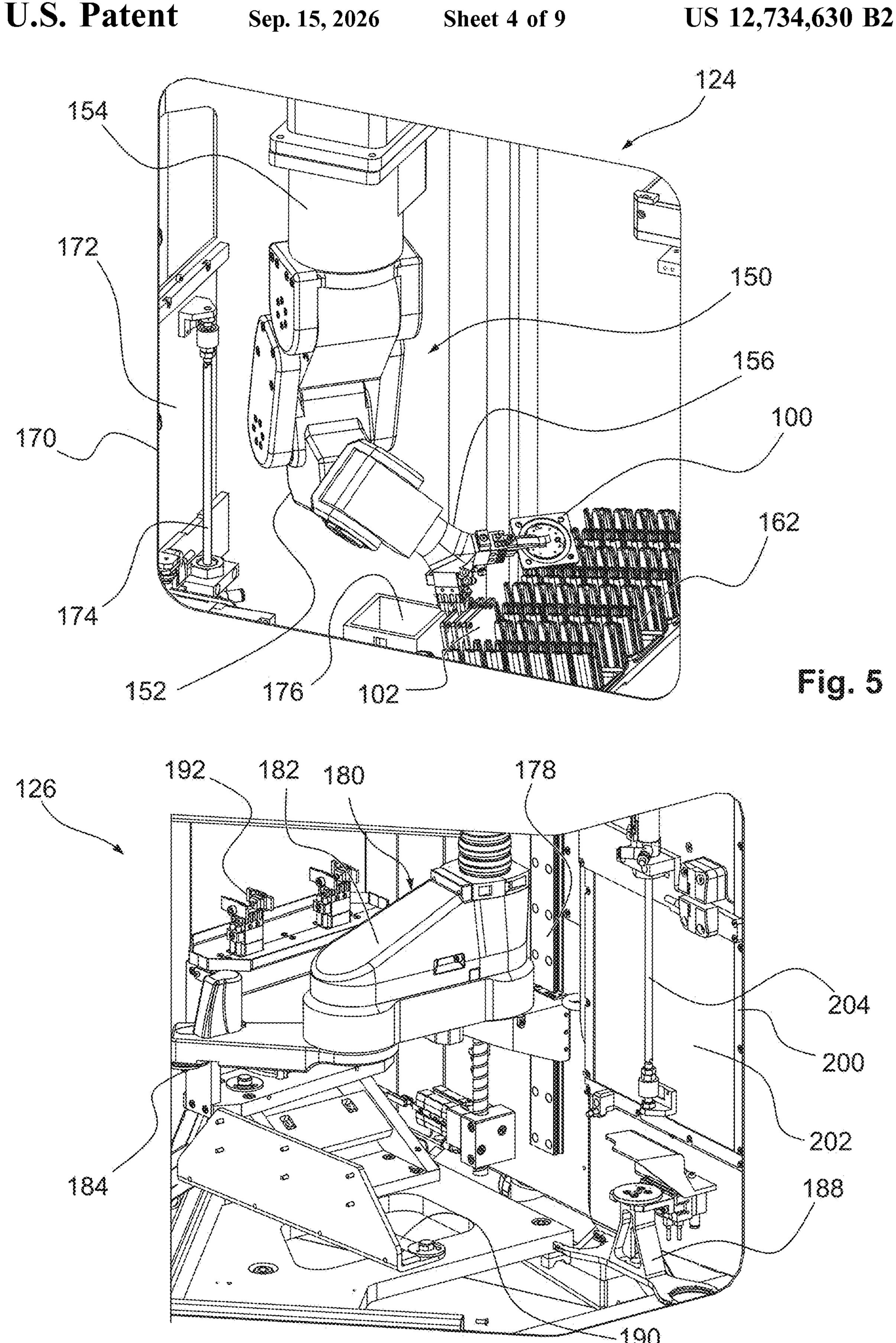
FIG. 5: is a perspective, enlarged partial view, which is based on the representation according to FIG. 5, for illustrating the handling cell.
FIG. 6: is a perspective, enlarged partial view based on the representation according to FIG. 5, for illustrating the setup cell.

In conjunction, FIGS. 4 and 5 describe the handling cell 124. The handling cell 124 comprises a handling unit 150, which is, in the exemplary embodiment, arranged as a robot 152. By way of example, the robot 152 is arranged as an articulated robot 152. The robot 152 is arranged hanging and supported at an upper base 154. The robot 152 comprises different degrees of freedom of movements, for the movement of workpieces 100.

The handling unit 150 carries a double gripper 156. In this way, the workpiece change can be accelerated, when a finished workpiece 100 can be removed with a gripper from the machine tool 10 and a new workpiece 100 can be inserted with the other gripper.

FIG. 5 illustrates a workpiece carrier 162, which is for instance a tray or shelf that is provided with a variety of storage locations for blanks 102 and/or workpieces 100. The handling unit 150 of the handling cell 124 can remove workpieces from the workpiece carrier 162 and transfer them to the machine tool 10. The handling cell 124 can be arranged for receiving of a workpiece carrier 162 or a plurality of workpiece carriers 162, cf. also FIG. 7.

FIG. 5 further illustrates an interface, which is designated by 170, between the handling cell 124 and the machining cell 122. The interface 170 comprises a door 172, which is provided with a drive 174. In the exemplary embodiment, the door 172 is arranged as a vertically movable sliding door, similar to a guillotine. The door 172 is movable between a closed position and an opened position. In the exemplary embodiment, the closed position is an upper position and the opened position is a lower position. For the workpiece change, the handling unit 150 can be moved, at least partially, through the open door 172 towards the working space 144 of the machine tool 10 in the machining cell.

Further, in FIG. 5 a discharge is indicated by 176, for instance. The discharge 176 is for instance arranged well for the removal of remaining pieces 106 (also referred to as slugs). The discharge 176 can be used, for instance, when the workpiece 100 is in the machine tool finally separated from the surrounding margin (remaining piece 106) of the blank 102. By way of example, the handling unit 150 can be used for grabbing the (for example annular) remaining piece 106 mechanically and for transferring it to the discharge 176. By way of example, the handling unit 150 can be used to grab the remaining piece 106, which is separated from the workpiece 100 (for example the circular blank 104 according to FIG. 3), by means of a suction gripper or mechanically, and to place it in a free place/seat of a workpiece carrier 162.

In conjunction, FIGS. 4 and 6 describe the setup cell 126. The setup cell 126 comprises a handling manipulator 180, which is arranged, in the exemplary embodiment, as so-called SCARA robot 182. A SCARA robot 182 is an articulated robot with several horizontal orientated pivot axes 186, cf. also FIG. 7. The handling manipulator 180 is movable, by a linear drive, along a vertical guide 178 inside the setup cell 126. At a working end of the handling manipulator 180, an interface 184 is provided. By way of example, the interface 184 serves for coupling a double gripper 188, which is illustrated in FIG. 6, in a park position remote from the interface 184.

With the double gripper 188, the handling manipulator 180 can exchange processing tools 46 between the setup cell 126 and the machine tool 10. In FIG. 6, different storage locations for processing tools 46 are indicated by 190, 192, which are arranged to accommodate processing tools 46 individually or block by block.

FIG. 6 illustrates further an interface, which is designated by 200, between the setup cell 126 and the machining cell 122. The interface 200 comprises a door 202, which is provided with a drive 204. In the exemplary embodiment, the door 202 is arranged as a vertically movable sliding door, similar to a guillotine. The door 202 is movable between a closed position and an opened position. In the exemplary embodiment, the closed position is a lower position and the opened position is an upper position.

Figure 7:
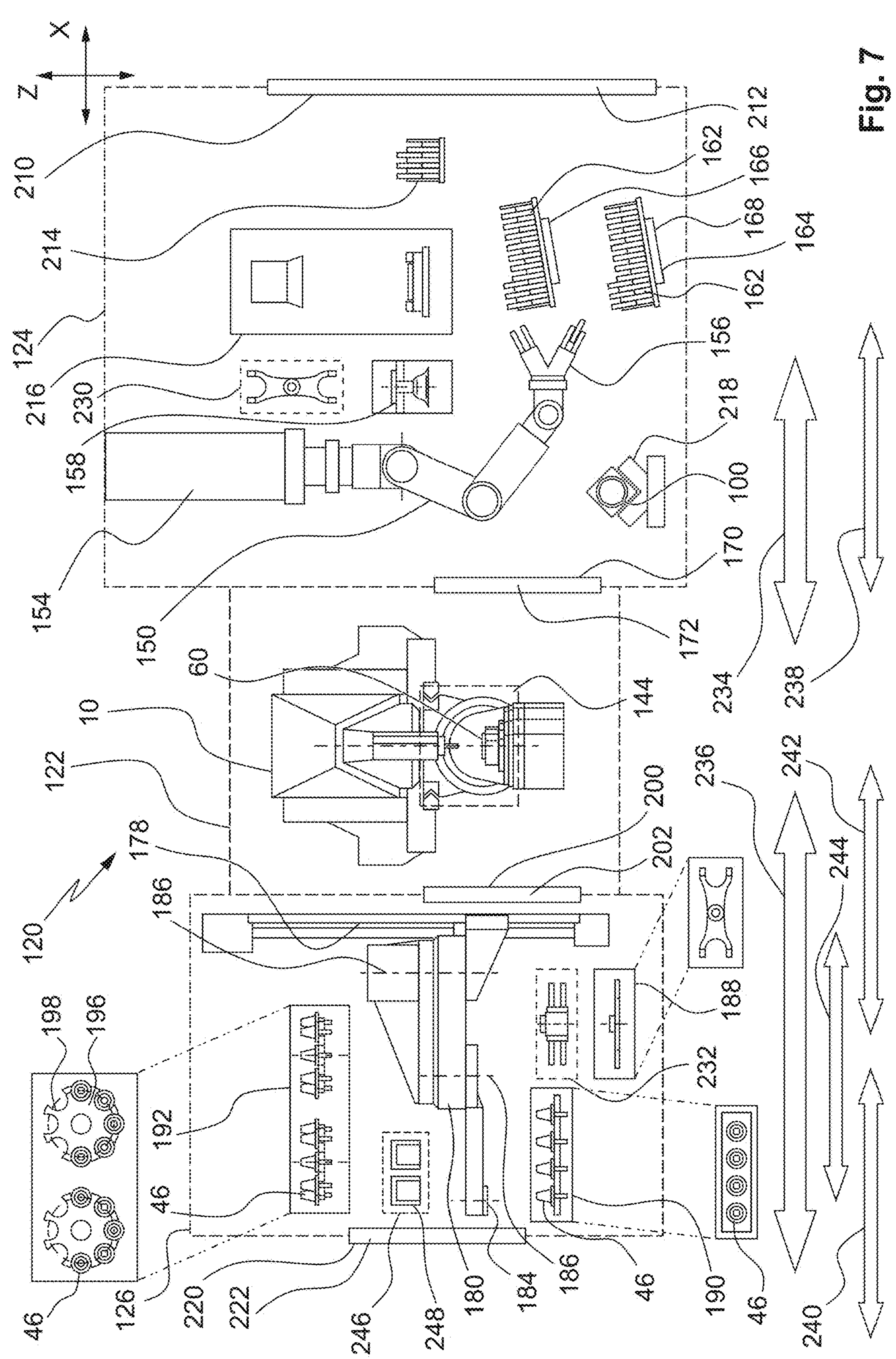
FIG. 7: is a simplified schematic view of a manufacturing system with machining cell, handling cell and setup cell, in a frontal orientation.

FIG. 7 illustrates a schematic frontal view of the manufacturing system 120 already illustrated with reference to FIGS. 4-6, with the cells 122, 124, 126, which are arranged modularly. The machining cell 122 and, for instance, the working space 144 of the machine tool 10 are small in relation to the dimensions of the handling cell 124. This also applies, at least partially, for a comparison of the machining cell 120 and the working space 144 with the dimensions of the setup cell 126.

Between the machining cell 122 and the handling cell 124, an interface 170 having a door 172 is arranged. Between the machining cell 122 and the setup cell 126, an interface 200 having a door 202 is arranged. The handling cell 124 further comprises another interface 210 having a door 212. The interface 210 can also be referred to as transfer interface. By way of example, the interface 210 is used for a transfer of workpiece carriers 162, which are equipped with a plurality or variety of workpieces 100.

For receiving one or more workpiece carriers 162, the handling cell 124 comprises, in the exemplary embodiment, buffer storages 164, 166, which are provided each with a support 168 for the accommodating of a workpiece carrier 162. The handling unit 150 can remove workpieces 100 with a double gripper 156 from one of the workpiece carriers 162 and carry out a workpiece change at the workpiece holder 60 of the machine tool 10. A processed workpiece 100 can then be stored in one of the workpiece carriers 162. The workpiece change is carried out through the interface 170.

In the exemplary embodiment, for increasing the accuracy of the positioning, a reference part 218 is arranged in the handling cell 124. By way of example, the reference part 218 serves as a reference stop for positioning and for centering the workpieces 100 prior to processing. In other words, despite a relatively inaccurate orientation, the handling unit 150 with the double gripper 156 can remove workpieces 100 from a workpiece carrier 162 and align them at the reference part 218 with high accuracy before changing them into the machine tool 10. This increases the positioning accuracy, despite a relatively inaccurate orientation of the plurality/variety of workpieces 100 at the workpiece carrier 162.

In FIG. 7, in addition, an auxiliary storage, which is designated by 214, is indicated in the handling cell 124. The auxiliary storage 214 can also be referred to as a quarantine storage. The auxiliary storage 214 serves for example for the temporary accommodation of a certain number of workpieces 100. By way of example, this can take place for quality control purposes.

In addition, in the exemplary embodiment according to FIG. 7, a monitoring station 216 is provided in the handling cell 124. By way of example, the monitoring station 216 is arranged as an optical monitoring station. This is not to be understood to be limiting. The monitoring station 216 enables a production-related inspection of workpieces 100, before they are transferred through the transfer interface 210. A functional coupling between the monitoring station 216 and the auxiliary storage 214 is possible, when the workpieces 100 to be checked are placed in the auxiliary storage 214.

It is also conceivable to replace the double gripper 156 by a suction gripper 158 or to equip the double gripper 156 with at least one suction gripper 158. By way of example, a suction gripper 158 is suitable for the handling of processed workpieces 100. With a suction gripper 158, a processed workpiece can be fluidically kept. This can be gentle to the material. By way of example, the use of a suction gripper 158 is possible when the workpiece 100 is separated completely of the margin (remaining piece 106).

In FIG. 7, a primary function of the handling unit 150 of the handling cell 124 is indicated by an arrow that is designated by 234. The primary function 234 is the workpiece change. However, it is also conceivable to provide at least one secondary function 238. By way of example, a secondary gripper 230 is provided, which is usable, if required, for the handling unit 150. With the secondary gripper 230, the handling unit 150 can change processing tools 46 instead of workpieces 100.

The handling cell 124 and the setup cell 126 are coupled to the machining cell 122 on opposite sides. The configuration, which is illustrated in FIG. 7, has the result that the machine tool 10 and, in certain embodiments, the working space 144 thereof are accessible at the front. By way of example, with relatively small processing spaces 144, a good visibility and a good accessibility can be achieved.

The setup cell 126 is provided with the handling manipulator 180, which comprises, in the exemplary embodiment, pivot axes 186, which are orientated parallel to the view plane according to FIG. 7. At the interface 184 of the handling manipulator, a gripper, for example the double gripper 188, can be attached. The double gripper 188 is shown in FIG. 7 for illustrative reasons in two views (side view and plan view).

With the double gripper 188, processing tools 46 can be changed between the setup cell 126 and the machine tool 10 in the machining cell 122. For the processing tools 46, different storage locations 190, 192 are provided in the setup cell 126. The storage locations 190, 192 are illustrated in FIG. 7 for illustrative reasons in two views (side view and plan view).

The storage location 190 comprises several individual places, each for the accommodating of single processing tools 46 (in FIG. 7, four processing tools 46 are accommodated in the storage location 190). By way of example, this involves a processing tool 46 with a standard tapered shaft.

The storage location 192 comprises tool sets 196, which are arranged disk-like or revolver-like, with a plurality of individual receiving seats 198 for processing tools 46. In other words, the processing tools 46 of the tool sets 196 can be transferred block by block. For this purpose, the interface 184 of the manipulator 180 can grip and hold the tool sets 196 directly, by way of example. In this way, the handling manipulator 180 can be used for a block setup. By way of example, this comprises a transfer of equipped or non-equipped tool sets 196, through an interface 220, which is provided with a door 222.

In FIG. 7, an arrow that is designated by 236 elucidates a primary function of the handling manipulator 180 of the setup cell 126. The primary function 236 is the tool change. However, it is also conceivable to provide at least one secondary function 240, 242. By way of example, a secondary function 240 relates to the block setup, i.e., the change of complete tool sets 196. By way of example, another secondary function 242 is a workpiece change by the handling manipulator 180 of the setup cell 126. For this purpose, by way of example, a secondary gripper 232 is provided in the setup cell 126, which is arranged for receiving and handling workpieces 100. In this way, the handling manipulator 180 of the setup cell 126 can transfer, as needed, at least individual workpieces 100 to the machine tool 10 into the machining cell 122, or remove them from there.

According to another exemplary embodiment, a secondary function 244 is provided, which comprises a change of pallets or clamping devices by the handling manipulator 180 of the setup cell 126. Accordingly, in FIG. 7, a storage for such fixtures 248 is indicated by 246. Such a fixture (clamping device) 248 can be arranged as a part of the workpiece holder 60 or otherwise be coupled with the workpiece holder 60. A fixture change by the handling manipulator 180 of the setup cell 126 is suitable when a change between different types of workpieces or workpiece dimensions take place, by way of example. Hence, the machine tool 10 comprises, for example, a table for supporting workpieces 100, which is equipped with a fixture 248 for holding and clamping the workpieces 100.

It is understood that the secondary function (cf. the arrows 238, 240, 242, 244 in FIG. 7) do not have to be provided in every implementation. Nevertheless, it is possible to upgrade the handling cell 124 and, if necessary, the setup cell 126 accordingly, at least in exemplary embodiments.

In the exemplary embodiment, the interface 220, which is remote from the machine tool, of the setup cell 126 is opposite to the machine side interface 200. In the exemplary embodiment, the interface 210, which is remote from the machine tool, of the handling cell 124 is opposite to the machine side interface 170. In other words, the handling cell 124 serves as a "mediator" between the machine tool 10 and further workpiece handling equipment, by way of example. In other words, the setup cell 126 serves as a "mediator" between the machine tool 10 and further handling equipment for the tool handling, by way of example.

With reference to the FIGS. 8-11, a combined transfer and storage device 252 (hereinafter: device) is described, which can be combined with at least one machine tool 10 and/or at least one manufacturing system 120 to form a production line 250.

The device 252 can be used for both for storage purposes and transfer purposes. The device is arranged to be coupled in a suitable manner with at least one machine tool 10, so that a partially automated or a highly automated workpiece change is possible. The device 252 comprises a storage level 260 with a plurality of storages 270. The term storage level is to be understood functionally. By way of example, the storages 270 involve one or more shelf storages.

The device 252 comprises a housing 262, which accommodates the storages 270 of the storage level 260. In the housing 262, there are accommodated further elements of the device 252. The housing comprises a longitudinal extension (cf. the double arrow 264, which illustrates a longitudinal direction), which is significantly larger than the transverse extension (cf. the double arrow 266, which illustrates a transverse direction) and significantly larger than the height extension (cf. the double arrow 268, which illustrates a height direction). In the exemplary embodiment, further, the height extension (arrow 268) is larger than the transverse extension (arrow 266).

Figure 8:
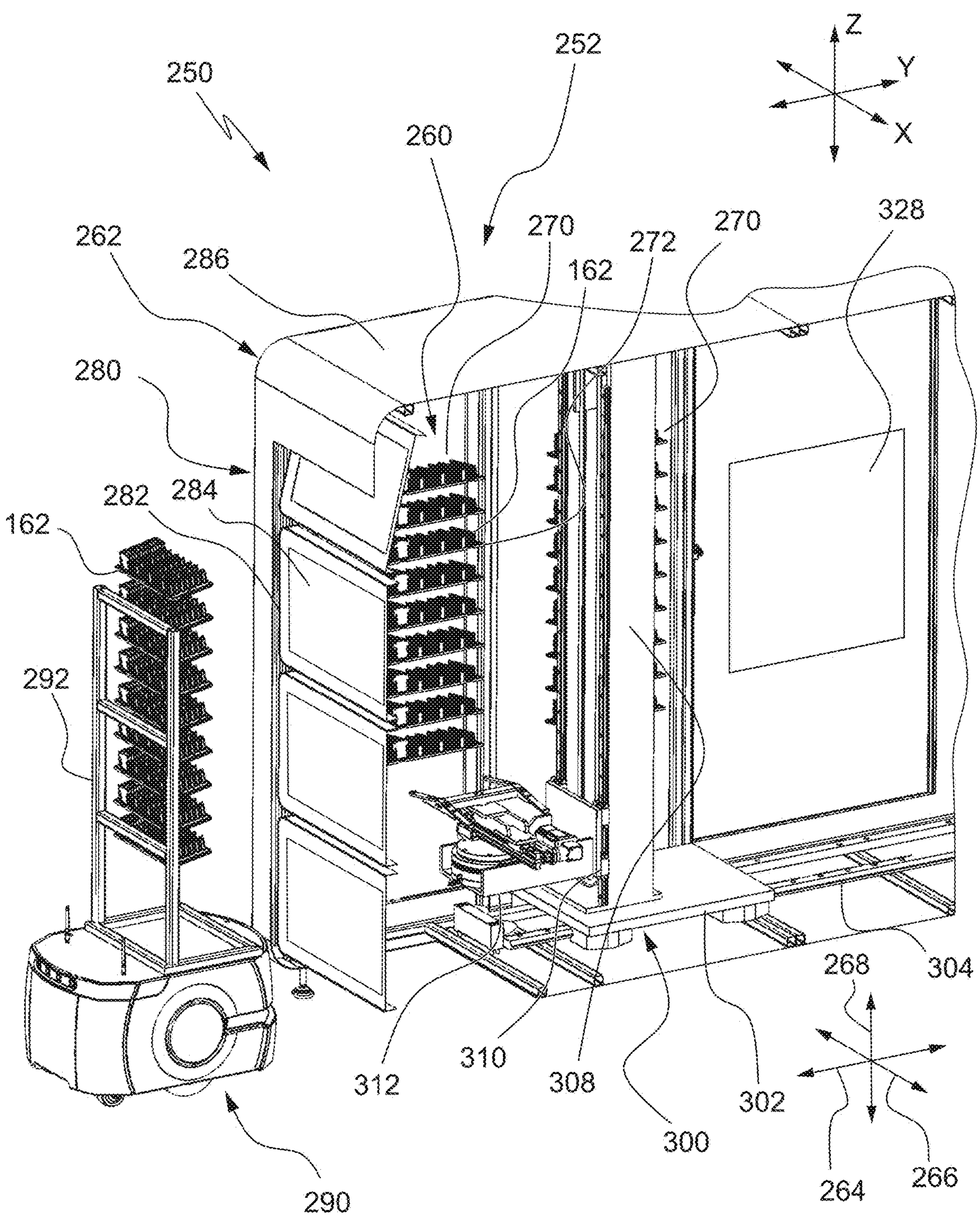
FIG. 8: is a perspective partial view of a manufacturing line having a combined transfer and storage device.

In the exemplary embodiment according to FIG. 8, the storages 270 comprise several storage locations 272, which are arranged one above the other, for receiving workpiece carriers 162. The workpiece carriers 162 each serve for receiving a plurality or a variety of workpieces 100. In the exemplary embodiment, the storage locations 272 each comprise supports 274 for supporting workpiece carriers 162, also cf. FIG. 9 and FIG. 10.

The device 252 comprises, at a front face, a feeding interface 280. In the exemplary embodiment, a driverless transport vehicle 290 is moved to the feeding interface 280 and coupled there with the device 252. Via the feeding interface 280, workpiece carriers 162 can be brought into the device 252 or removed from the device 252. The transport vehicle 290 is arranged, in the exemplary embodiment, as an automated transport vehicle (AGV) and provided with a plurality of workpiece carriers 162, which are arranged one above the other at a frame 292.

The transfer of the workpiece carriers 162 through the feeding interface 280 takes place in an opened state of the feeding interface 280. The feeding interface 280 comprises a door 282 that is arranged, in the exemplary embodiment, as a segment door and that comprises a plurality of segments 284. The door 282 forms, in the closed state, a vertical closure level. The door 282 is movable between an opened and a closed state. In the opened state, the door 282 is at least sectionally movable under an upper side 286 of the housing 262. In other words, in the exemplary embodiment, the segments 284 of the door 282 are, in the opened state, guided under the roof (of the upper side 286) of the housing 262 of the device 252 and kept there, as needed. This has the result that in the opened state of the door 282, the floor area and the lateral side around the feeding interface 280 are easily accessible.

The device 252 comprises a transfer device 300, which comprises a longitudinal drive 302, which comprises a carriage, which is movable along a guide 304, which extends in longitudinal direction 264. In other words, the longitudinal drive 302, in the exemplary embodiment, is guided on the ground-side. The longitudinal drive 302 carries a traveling column 308. The traveling column is movable translatory in the longitudinal direction 264 by the transfer device 300.

The transfer device 300 supports a handling unit 312, which is arranged for the handling of workpiece carriers 162. The handling unit 312 is vertically (arrow 268) movable by a vertical drive 310 along a vertical guide at a traveling column 308. The vertical drive 310 can also be referred to as lift drive. The transfer device 300 can move the handling unit 312 in the longitudinal direction 264, as needed, between the storages 270, the feeding interface 280 and at least one machining interface 328.

Figure 9:
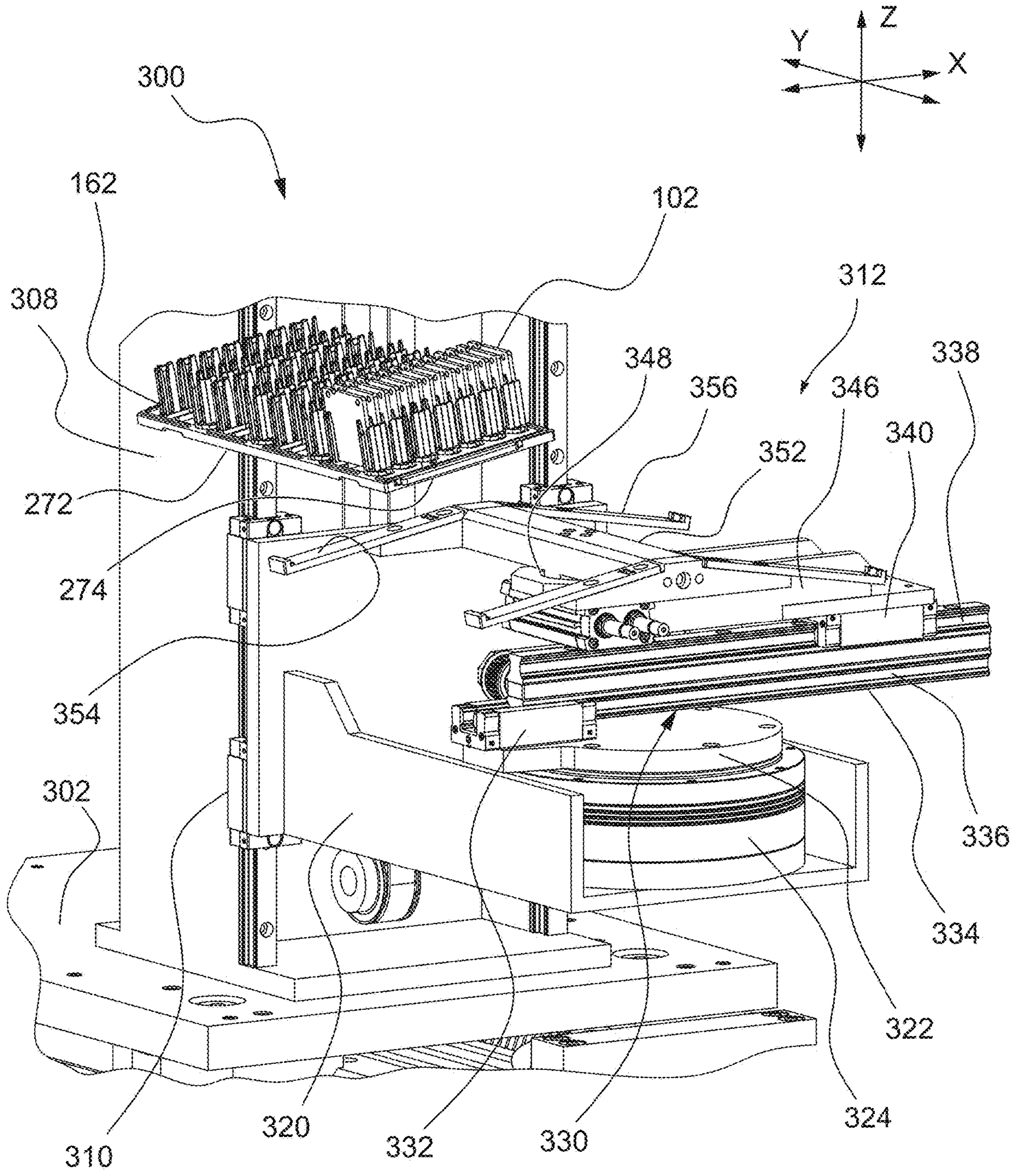
FIG. 9 is a perspective, enlarged partial view of the device, based on the representation according to FIG. 8, for illustrating a transfer device.
Figure 10:
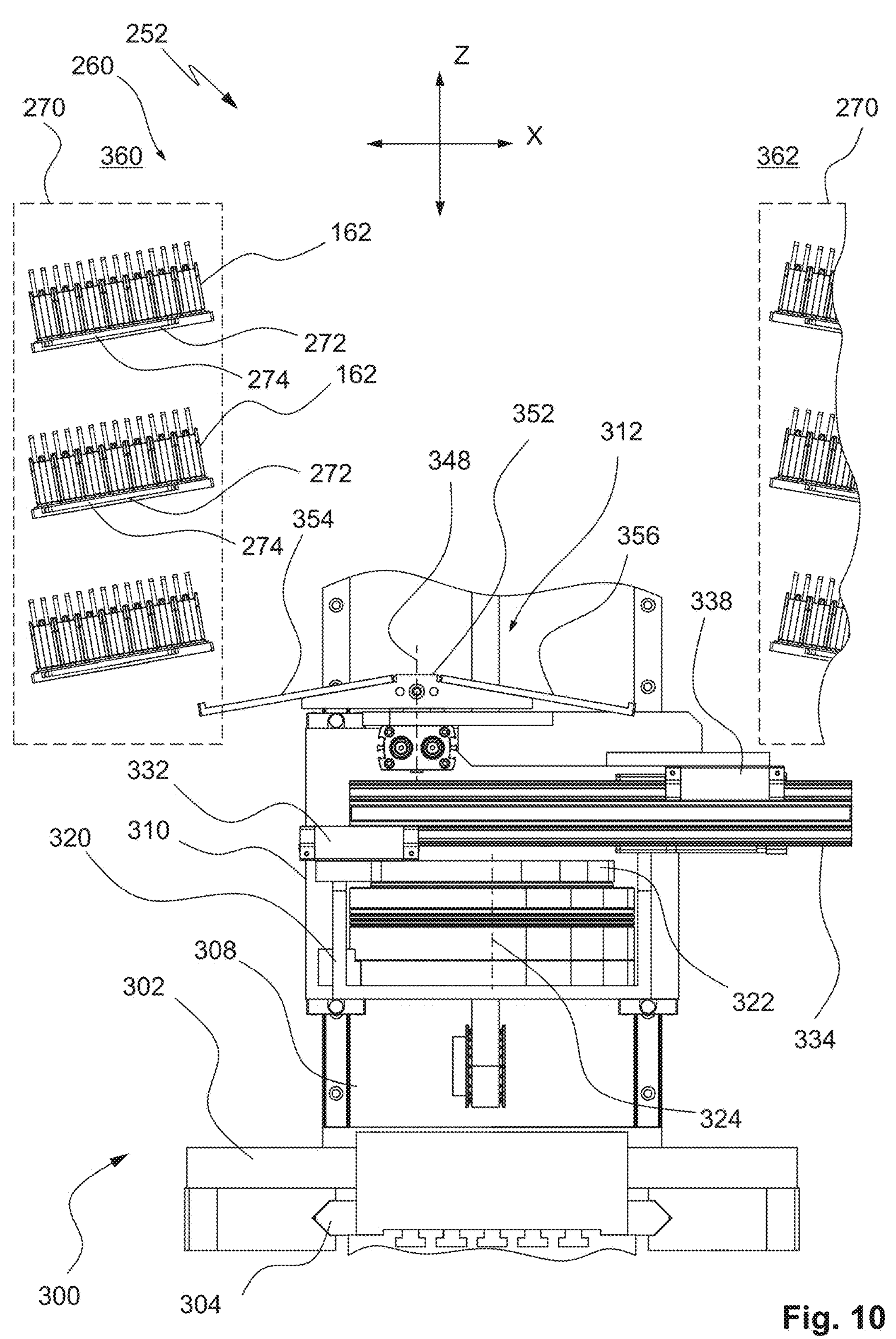
FIG. 10 is a frontal partial view of a device, according to the FIGS. 8 and 9.

With reference to FIGS. 9 and 10, the detailed design of the device 252 having a transfer device 300, which is shown in the exemplary embodiment, will be elucidated in more detail.

FIG. 9 shows a perspective and enlarged view of the transfer device 300 and, for instance of the handling unit 312 that is supported thereon. The transfer device 300 comprises the traveling column 308, on which the handling unit 312 is movably held by the vertical drive 310.

The handling unit 312 comprises a console 320, which is vertically movable by the vertical drive 310. The console 320 carries a table 322, which can be swiveled around a vertically oriented rotation axis by a rotatory drive 324. In this way, the table 320 can be rotated in a horizontal plane. The table 322 carries a linear drive 330. The linear drive 330 is arranged, in the exemplary embodiment, as telescopic linear drive.

The linear drive 330 comprises a base guide 332, which rests on the table 322. At the base guide 332, a telescopic guide 334 is supported and movably mounted. The telescopic guide 334 comprises, in an exemplary embodiment, a first guide portion 336 and a second guide portion 338. The first guide portion 336 is facing to the base guide 332. The second guide portion 338 is facing a carrier 340. The two guide portions 336, 338 extend parallel to each other. In this way, the effective travel range of the linear drive 330 is increased. Overall, the linear drive 330 can be swiveled via the rotatory drive 324.

Hereby, the carrier 340 is also swiveled. Additionally, the carrier 340 can be moved linearly by the linear drive 330. The carrier 340 carries a console 346, which in turn supports a beam 352 arranged as a double beam. In the exemplary embodiment, in addition, another rotatory drive 348 with vertically oriented rotation axis is arranged between the console 346 and the carrier 340. In the exemplary embodiment, the beam 352 is arranged as a double beam, which extends symmetrically to a symmetry plane, which intersects with the rotation axis of the rotatory drive 348, by way of example.

The beam 352 comprises two supporting seats 354, 356, which each can support a workpiece carrier 162. In the exemplary embodiment, the supporting seats 354, 356 are each slightly inclined relative to the horizontal. The inclination of the supporting seats 354, 356 is adapted to the inclination of the support 274 in the storages 270. In the exemplary embodiment the supporting seats 354, 356 are formed by fork arms, which are able to grip under a workpiece carrier 162. In a plan view, the double beam 352 comprises an H-shaped design, by way of example.

By means of the (double) beam 352, workpiece carriers 162 can be changed quickly, because two supporting seats 354, 356 are provided, and because the rotatory drive 358 enables a rotation of the beam 352 around a symmetry axis.

Figure 11:
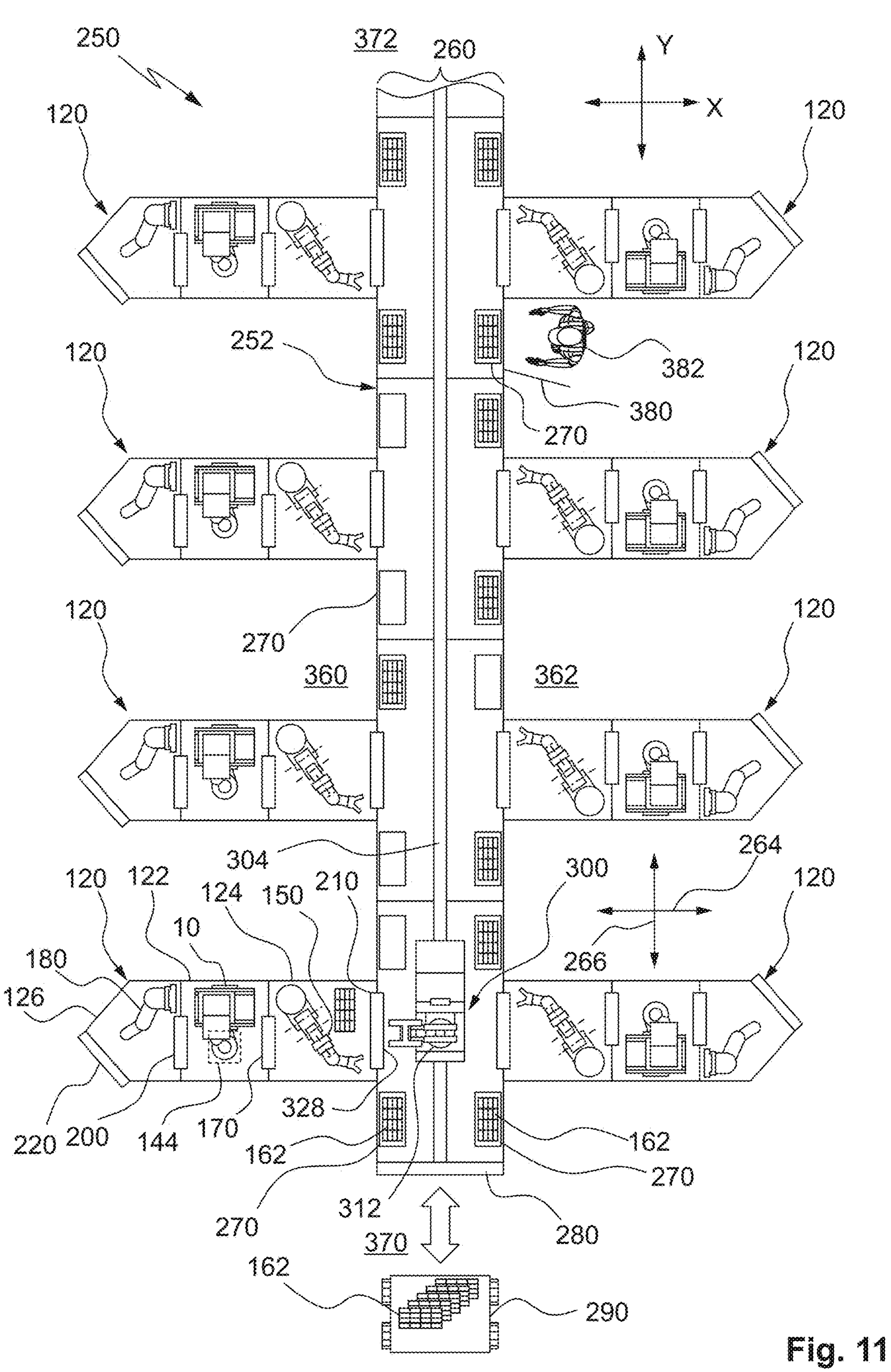
FIG. 11 is a schematic plan view on a manufacturing line with a combined transfer and storage device, and a manufacturing system coupled thereto.

The rotatory drive 324, which is coupled with the table 322, enables a pivoting of the linear drive 330, for example between an orientation to a first side (left side 360 in FIG. 10), to an opposite second side (right side 362 in FIG. 10) and, as needed, to a front face (cf. the two front faces 370, 372 in FIG. 11). In other words, for example, the rotatory drive 324 can, departing from a 0° position (parallel to the longitudinal direction 264), be pivoted by +90° and −90°, to approach the two sides 360, 362.

The design of the linear drive 330 as telescopic linear drive enables sufficiently large travel ranges, even with a limited transverse extension (transverse direction 266) of the device 252 and/or of the housing 262 thereof. In this context, FIG. 10 exemplarily illustrates the installation space relations in the exemplary embodiment. The transfer device 300 with the handling unit 312 can be moved between the storages 270 on the first side 360 and the second side 362, and, if needed, place and receive workpiece carriers 162 there in the storage level 260. In addition, a change of workpiece carriers 162 via the feeding interface 280 (cf. FIG. 8) is possible. In this way, the device 252 serves not only as transfer device but also as storage device with a considerable storage capacity in the storage level 260.

FIG. 11 illustrates with reference to a schematic simplified plan view an exemplary configuration of a manufacturing line 250, which is provided with a device 252 according to the present disclosure. Further, the manufacturing line 250 comprises a plurality of manufacturing systems 120 according to the present disclosure. FIG. 11 shows a topology, which is similar to a bus topology. It is understood that the position of the storages 270 and/or of the manufacturing systems 120 can be selected sufficiently flexible. The manufacturing systems 120 are each coupled with their transfer interface 210 to one of the machining interfaces 328 of the device 252. In FIG. 11, some of the storages 270 are occupied by workpiece carriers 162, others are not.

In the exemplary embodiment, the exchange of workpieces 100 between the device 252 and the machine tool 10 in the machining cell 122, takes place mediately by means of the handling cell 124 with the handling unit 150.

The device 252 extends, in the exemplary embodiment, between a first end face 370 and a second end face 372. At at least one of the two end faces 370, 372, a feeding interface 280 for coupling a vehicle 290 is provided. Within the device 252, the transfer device 300 with the handling unit 312 takes over the transfer of workpiece carriers 162.

FIG. 11 further illustrates the lateral accessibility of the storages 270. In the exemplary embodiment, on the side 362 (here: right side) an operator is indicated by 382, which stands, in top view, upright in front of one of the storages 270. The storages 270 of the storage level 260 are accessible via doors 380. Also in this way, a feeding of the device 252 can take place. At least some of the storages 270 of the storage level 260 are laterally accessible for operators 382.

The different manufacturing systems 120 can carry out consecutive production steps. The transfer between individual manufacturing systems 120 and optionally an intermediate storage takes place by the combined transfer and storage device 252. However, it is also conceivable, a parallel processing of similar production steps by several manufacturing systems 120, to increase the throughputs of the entire manufacturing line 250.

In the exemplary embodiment according to FIG. 11, the tool change takes place primarily via the respective setup cell 126 of the manufacturing system 120, for instance via the handling manipulator 180 that is provided there. The feeding of the setup cell 126 takes place via the interface 220, which is functionally facing away from the device 252.

It has already been explained that, in addition to the primary function of the setup cell 126 (tool change) and handling cell 124 (workpiece change), basically secondary functions are also conceivable. By way of example, this relates to at least a limited workpiece change capability of the setup cell 126 and, at least a limited tool change capability of the handling cell 124.

The invention claimed is:

1. A manufacturing system, comprising:

a machine tool, comprising:

a frame block, a working space having a rear side, a front side opposite to the rear side, and two opposite lateral sides, an X-slide movably arranged on an X-guide and horizontally movable relative to the frame block, a Y-slide movably arranged on a Y-guide and horizontally movable relative to the frame block, a Z-slide movably arranged on a Z-guide and vertically movable relative to the frame block, and a rotary drive, which supports a rotary table with a workpiece holder, wherein the X-slide, the Y-slide, the Z-slide and the rotary drive are movable relative to one another and configured for the machining, with a processing tool that is received on a tool holder, of a workpiece that is placed on the workpiece holder in the working space; and a handling cell, comprising:

an interface to the machine tool, which is configured for lateral coupling to one of the two lateral sides of the working space, a handling unit that is configured for an automated workpiece change, and at least one buffer storage configured to hold at least one workpiece carrier, wherein the handling cell is arranged adjacent to the working space, and wherein the handling unit is configured to perform the automated workpiece change between the workpiece holder in the working space and the at least one buffer storage in the handling cell.

2. The manufacturing system of claim 1, wherein the handling unit is an articulated robot that is configured to move workpieces through the interface for loading and unloading workpieces.

3. The manufacturing system of claim 2, wherein the articulated robot is a hanging articulated robot having a workpiece gripper.

4. The manufacturing system of claim 3, wherein the workpiece gripper is a double gripper.

5. The manufacturing system of claim 2, wherein the articulated robot has a movement range encompassing the interface and a workpiece transfer position with the workpiece holder.

6. The manufacturing system of claim 1, wherein the handling unit is configured to enter the working space for the automated workpiece change and is further configured to move out of the working space during machining.

7. The manufacturing system of claim 1, wherein a door is formed between the working space and the handling cell, the door being assigned to the interface and movable between a closed state and an open state, and wherein in the open state of the door, the workpiece holder is accessible through the interface for the handling unit for the automated workpiece change.

8. The manufacturing system of claim 7, wherein the working space is unaffected by the handling unit when the door is closed and the handling unit is retracted from the working space.

9. The manufacturing system of claim 1, wherein the at least one buffer storage comprises at least one support for a workpiece carrier having a plurality of storage locations, which are arranged for accommodating workpieces.

10. The manufacturing system of claim 1, wherein the at least one buffer storage is arranged to support a first workpiece carrier for providing blanks and a second workpiece carrier for accommodating processed workpieces or remnants, and wherein the at least one buffer storage is arranged to accommodate the first workpiece carrier and the second workpiece carrier together in the handling cell.

11. The manufacturing system of claim 1, further comprising:

a setup cell having a handling manipulator, wherein the handling cell is coupled to a first lateral side of the working space, wherein the setup cell is coupled to a second lateral side of the working space that is opposite to the first side, wherein the handling manipulator is arranged for an automated tool change between the tool holder and the setup cell through a setup interface that is provided at the second lateral side of the working space.

12. The manufacturing system of claim 11, wherein a door is located between the working space and the setup cell, the door being assigned to the setup interface and movable between a closed state and an open state, and wherein in the open state of the door, the tool holder is accessible through the interface setup for the handling manipulator for the automated tool change.

13. The manufacturing system of claim 12, wherein the working space is unaffected by the handling manipulator when the door is closed and the handling manipulator is retracted from the working space.

14. The manufacturing system of claim 11, wherein a plurality of tool storage locations are provided in the setup cell, and wherein the handling manipulator is configured to transfer tools between the tool holder and a selected one of the plurality of tool storage locations.

15. A manufacturing system, comprising:

a machine tool, comprising:

a frame block, a working space having a rear side, a front side opposite to the rear side, and two opposite lateral sides, an X-slide movably arranged on an X-guide and horizontally movable relative to the frame block, a Y-slide movably arranged on a Y-guide and horizontally movable relative to the frame block, a Z-slide movably arranged on a Z-guide and vertically movable relative to the frame block, and a rotary drive, which supports a rotary table with a workpiece holder, wherein the X-slide, the Y-slide, the Z-slide and the rotary drive are movable relative to one another for machining a workpiece that is placed on the workpiece holder in the working space with a processing tool that is received on a tool holder; and a handling cell, comprising:

an interface to the machine tool, which is configured for lateral coupling to one of the two lateral sides of the working space, a handling unit that is configured for an automated workpiece change, and at least one buffer storage configured to hold at least one workpiece carrier, wherein the handling cell is arranged adjacent to the working space, and wherein the handling unit is configured to perform the automated workpiece change between the workpiece holder in the working space and the at least one buffer storage in the handling cell, wherein the interface is a first interface, wherein the handling cell comprises a second interface opposite to the first interface, wherein the handling unit is supported in the handling cell between the first interface and the second interface, wherein the handling unit has a movement range encompassing the first interface and the second interface.

16. The manufacturing system of claim 15, wherein a door is assigned to the second interface and movable between a closed state and an open state, and wherein in the open state of the door, the second interface allows workpiece transfer.

17. The manufacturing system of claim 15, wherein the handling cell is arranged as a gate between the machine tool that is coupled to the first interface and a transfer device that is coupled to the second interface.

18. A manufacturing system, comprising:

a machine tool, comprising:

a frame block, a working space having a rear side, a front side opposite to the rear side, and two opposite lateral sides, an X-slide movably arranged on an X-guide and horizontally movable relative to the frame block, a Y-slide movably arranged on a Y-guide and horizontally movable relative to the frame block, a Z-slide movably arranged on a Z-guide and vertically movable relative to the frame block, and a rotary drive, which supports a rotary table with a workpiece holder, wherein the X-slide, the Y-slide, the Z-slide and the rotary drive are movable relative to one another for machining a workpiece that is placed on the workpiece holder in the working space with a processing tool that is received on a tool holder; and a handling cell, comprising:

an interface to the machine tool, which is configured for lateral coupling to one of the two lateral sides of the working space, a handling unit that is configured for an automated workpiece change, and at least one buffer storage configured to hold at least one workpiece carrier, wherein the handling cell is arranged adjacent to the working space, and wherein the handling unit is configured to perform the automated workpiece change between the workpiece holder in the working space and the at least one buffer storage in the handling cell, wherein the handling manipulator is an articulated robot with several horizontal pivot axes that is configured to be movable along a vertical guide inside the setup cell.

* * * * *